United States Patent
Horiuchi et al.

(10) Patent No.: US 10,659,522 B2
(45) Date of Patent: May 19, 2020

(54) SHARING APPLICATION LOCAL ENVIRONMENT

(75) Inventors: Yoshio Horiuchi, Kanagawa (JP); Kenji Uchida, Tokyo (JP); Masaki Wakao, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 13/304,290

(22) Filed: Nov. 23, 2011

(65) Prior Publication Data
US 2012/0136925 A1 May 31, 2012

(30) Foreign Application Priority Data
Nov. 30, 2010 (JP) ................................ 2010-266585

(51) Int. Cl.
| | |
|---|---|
| *H04L 29/08* | (2006.01) |
| *G06Q 10/10* | (2012.01) |
| *G06F 9/445* | (2018.01) |
| *G06F 8/20* | (2018.01) |
| *G06F 8/71* | (2018.01) |
| *H04L 29/06* | (2006.01) |
| *G06F 9/455* | (2018.01) |

(52) U.S. Cl.
CPC ............ *H04L 67/08* (2013.01); *G06F 8/20* (2013.01); *G06F 8/71* (2013.01); *G06F 9/44505* (2013.01); *G06Q 10/101* (2013.01); *H04L 67/38* (2013.01); *G06F 2009/45562* (2013.01)

(58) Field of Classification Search
CPC .................................. H04L 67/08; G06F 8/20
USPC ......................................................... 709/203
See application file for complete search history.

(56) References Cited

U.S. PATENT DOCUMENTS

| | | | |
|---|---|---|---|
| 7,877,445 B2 | 1/2011 | Komine et al. | |
| 2002/0080173 A1* | 6/2002 | Tagami | A63F 13/12 715/753 |
| 2007/0288884 A1* | 12/2007 | Brunssen | G06F 8/36 717/101 |
| 2008/0235654 A1 | 9/2008 | Marius | |
| 2008/0244418 A1* | 10/2008 | Manolescu | G06Q 10/00 715/753 |
| 2009/0228576 A1* | 9/2009 | Rosenan et al. | 709/221 |
| 2009/0260007 A1* | 10/2009 | Beaty et al. | 718/1 |

(Continued)

FOREIGN PATENT DOCUMENTS

| | | |
|---|---|---|
| JP | 2005242899 A | 9/2005 |
| JP | 2007213203 | 8/2007 |

(Continued)

OTHER PUBLICATIONS

Simon Mackie, "EtherCodes:Online Collaborative Code Editing", URL: http://gigaom.com/2010/10/26/ethercodes-online-collaborative-code-editing, Oct. 26, 2010.

*Primary Examiner* — Philip C Lee
(74) *Attorney, Agent, or Firm* — Christopher M. Pignato

(57) ABSTRACT

Cloning a local environment is described. Cloning a local environment can enable sharing the environment during pair programming. Cloning can have other uses as well. A server or other computer may maintain a clone environment of a first client apart from a second client such that the cloned computing environment, mimicking the environment of the first client, may be maintained on behalf of and used by a second client.

20 Claims, 17 Drawing Sheets

(56) References Cited

U.S. PATENT DOCUMENTS

| | | | |
|---|---|---|---|
| 2009/0300151 A1* | 12/2009 | Friedman et al. | 709/222 |
| 2009/0300604 A1* | 12/2009 | Barringer | 717/178 |
| 2010/0192220 A1* | 7/2010 | Heizmann | G06F 11/3664 726/19 |
| 2010/0257409 A1* | 10/2010 | Aranwela et al. | 714/38 |
| 2011/0125798 A1* | 5/2011 | Misch | G06F 8/71 707/785 |

FOREIGN PATENT DOCUMENTS

| | | |
|---|---|---|
| JP | 2007226287 | 9/2007 |
| JP | 2009534736 | 9/2009 |
| JP | 2010522397 | 7/2010 |
| WO | WO2008115644 | 9/2008 |

* cited by examiner

SHARING APPLICATION LOCAL ENVIRONMENT

BACKGROUND

The present invention relates to techniques, device, processes, articles of manufacture, and the like for enabling content to be jointly edited or browsed from a plurality of client computers, and in particular, relates to techniques for creating, in a server computer, a clone of a local environment of an application to be executed in a client computer.

Pair programming is one practice of eXtreme Programming (also called XP) in which multiple developers jointly develop the same program. In pair programming, developers perform development work in the same physical location, e.g., at seats next to each other. Pair programming has an advantage especially in, for example, improving the quality of code. However, a pair of developers is fluid. For example, one of developers paired with each other in the morning may form a pair with another developer in the afternoon.

Japanese unexamined patent application publication No. 2010-522397, which is a translation of PCT application publication WO2008115644, describes a system using a centralized database or other information store, to store real-time active meta-model information about a particular software application being developed by a team of developers and/or other users. The centralized database is accessed by a software development applications being used by the team of developers to provide the team with access to the active meta-model information. By having access to this information, developers are provided with real-time relevant information about the active state of an application under development by a team of other people.

BRIEF SUMMARY

In many distributed development environments the respective schedules of developers may differ from each other and the developers may also be in separate spaces and may be distant from one another. Embodiments can provide a technique for enabling pair programming in a development environment that can be shared and where the program development may be performed in a local environment of each developer. In embodiments, a technique that enables pair programming in a development environment that can be shared and maintained at the local environment of a client can be provided.

Pair programming embodiments may include platforms and support wherein a developer can be protected from or prevent another developer from changing or destroying a local environment. In embodiments, pair programming may be employed wherein only documents or code requiring pair programming can be edited by a user of each client.

In embodiments of the present invention a technique for creating a computing environment can include: (1) at least two client computers; (2) a server computer that can be connected to the clients via a network; and (3) a clone (hereinafter also called the clone environment) of a local environment of an application executed in a client out of the at least two clients on the server. In embodiments, a user of each of the clients can edit or browse content on demand using the clone environment.

In embodiments, the local environment of the application may include, for example, an integrated development environment (hereinafter also called an IDE), an office application environment, and an educational support environment. In particular, the local environment of the application may be an application development local environment.

In embodiments the clone environment may be an environment that is identical to the local environment of a client and is created in a distributed development environment on a server. The distributed development environment on the server may include information necessary for development (for example, a trouble report or the change management information, such as a task). Even after terminating operations, the clone environment may be stored on the server for, for example, verification.

In embodiments the content may include, for example, a document, code, office application data, and an educational support file. A document may be, for example, a file used in program development. Code may be, for example, a source file in software development and office application data may include, for example, document data, spreadsheet data, presentation data, and drawing data. Still further, an educational support file may be, for example, data that may be used between a student and a teacher or between a student and an educational support application.

The embodiments may also provide a process for creating a clone (clone environment) of the local environment of a first client on the server. This process may include the steps of: receiving, in response to a request to create the clone environment from a user of the first client, a notice of intent to participate in the clone environment from at least one of the other clients (hereinafter called the second client) different from the first client; creating the clone environment on the server using information on the local environment held by the first client; and enabling editing or browsing, by the first client and the second client having sent the notice of intent to participate in the clone environment, of content in the clone environment.

In embodiments, the process may also include the step of inquiring, upon receipt of the notice of intent to participate, whether the first client permits the second client, having sent the notice of intent to participate to the first client or a user in association with the second client, to participate in the clone environment. Then, upon receipt of permission for the second client having sent the notice of intent to participate or the user in association with the second client to participate in the clone environment from the first client, the clone environment may be created on a server.

In embodiments, processes may further include the step of: inquiring of a client whether the client participates in the clone environment, in response to the request to create the clone environment.

The embodiments may also include processes for creating a clone environment of a local environment of a first client on the server. This process may include: creating, in response to a request to create the clone environment from a user of the first client, the clone environment on the server using information on the local environment held by the first client; receiving a notice of intent to participate in the clone environment created on the server from at least one of the other clients (second client) different from the first client; and enabling editing or browsing, by the first client and the second client having sent the notice of intent to participate in the clone environment, of content in the clone environment.

In embodiments, the second method may further include the step of inquiring of, upon receipt of the notice of intent to participate, whether the first client permits the second client to have sent the notice of intent to participate to the first client or a user in association with the second client, to participate in the clone environment. Then, upon receipt of permission for the second client having sent the notice of intent to participate or the user in association with the second client to participate in the clone environment from the first client, the editing or browsing the content.

Also in embodiments, creating a clone environment on the server may include the steps of: retrieving, using the information on the local environment, components of an environment (for example, a development environment) for creating the clone environment on the basis of the information from a repository (for example, a software configuration management (SCM) server) in association with the server or a database retaining components of a client environment; and merging components of the local environment of the application held by the first client into the retrieved components. In this and other embodiments, enabling editing of the content may include the steps of: checking, upon start of editing of a file on the server, whether information in association with a name of the file has been sent from the first client; and in a case where the information in association with the name of the file has not been sent from the first client, sending the name of the file to the first client, acquiring the information in association with the sent name of the file from the first client, and retrieving parameters corresponding to the acquired information from a registry existing in the server. Also, in a case where the information in association with the name of the file has been sent from the first client, embodiments may retrieve the parameters corresponding to the information in association with the name of the file from the registry existing in the server, and merge the parameters of the local environment of the application held by the first client into the retrieved parameters.

Embodiments of the present invention may enable editing or browsing of the content in the clone environment and may be implemented by causing a first client to switch the local environment on a screen of the first client to the clone environment on a server or display a window of the clone environment on a server on the screen of the first client. Also, embodiments may provide a computer program for causing a server to perform the steps in the processes described throughout.

In devices embodiments, a computer creating the clone or clone environment of the local environment of a first client on the server may include: a receipt means for receiving a notice of intent to participate in the clone environment from at least one of the other clients different from the first client; a creation means for creating the clone environment on the server using information on the local environment held by the first client, and a clone processing means for enabling editing or browsing, by the first client and the second client having sent the notice of intent to participate in the clone environment, of content in the clone environment.

Still further, in embodiments a plurality of users may be able to edit or browse content that can be edited in a client computer at the same time, using a clone environment. And, in embodiments, a clone environment may be used in editing or browsing content by a user of each client, and the local environment of a client may not be changed or destroyed. Also, when the clone environment is created on demand upon a request from a user of a client, or in other situations as well, editing or browsing of content can be started on a server when the user requires.

DETAILED DESCRIPTION

Embodiments of the present invention will now be described with reference to the drawings. Unless otherwise specified, the same signs denote the same components throughout the drawings referenced below. It is to be understood that the embodiments of the present invention are for the purpose of describing preferred aspects of the present invention and are not intended to limit the scope of the invention thereto.

Figure 1:
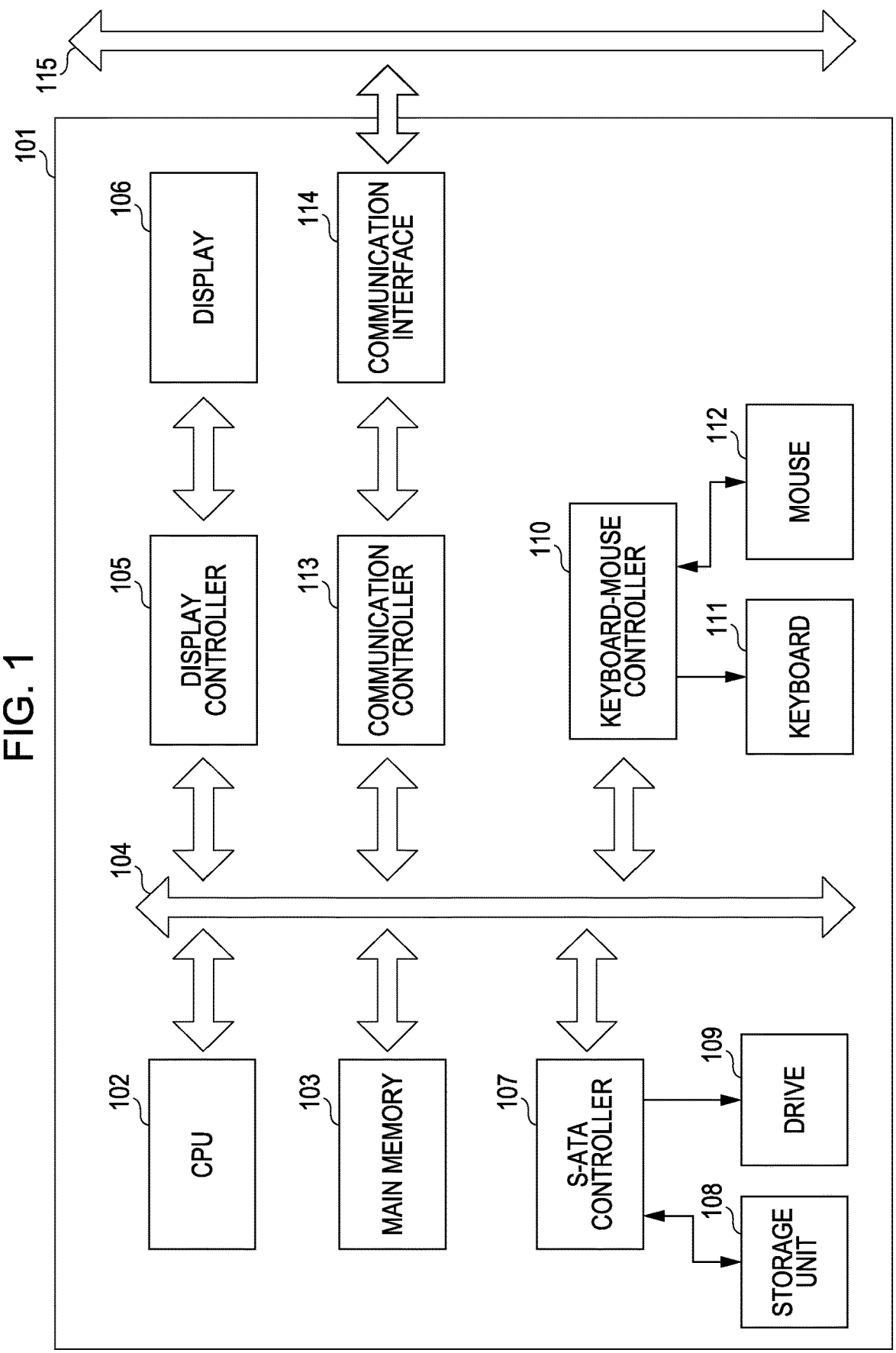
FIG. 1 illustrates a basic block diagram of computer hardware according to embodiments of the present invention.

FIG. 1 illustrates a basic block diagram of computer hardware according to an embodiment of the present invention. A computer (101) includes a CPU (102) and a main memory (103) connected to a bus (104). The CPU (102) is preferably based on the 32-bit or 64-bit architecture. For example, the Core i™ series, the Core 2™ series, the Atom™ series, the Xeon™ series, the Pentium® series, or the Celeron® series of Intel Corporation or the Phenom™ series, the Athlon™ series, the Turion™ series, or Sempron™ of AMD may be used as the CPU (102). A display (106) such as a liquid crystal display (LCD) may be connected to the bus (104) via a display controller (105). The display (106) is used to display, for management of computers, information on a computer connected to a network via a communication line and information on software running on the computer using an appropriate graphics interface. A storage unit (108) such as a hard disk or solid state drive and a drive (109) such as a CD, DVD, or BD drive may be connected to the bus (104) via an SATA or IDE controller (107). Moreover, a keyboard (111) and a mouse (112) may be connected to the bus (104) via a keyboard-mouse controller (110) or a USB bus (not shown).

An operating system, programs providing a Java® processing environment, Java® applications, a Java® virtual machine (JVM), and a Java® just-in-time (JIT) compiler, such as J2EE, other programs, and data are stored in the storage unit (108) to be loadable to the main memory. The drive (109) is used to install a program from a CD-ROM, DVD-ROM, or BD to the storage unit (108) as necessary. A communication interface (114) is based on, for example, the Ethernet® protocol. The communication interface (114) is connected to the bus (104) via a communication controller (113), physically connects the computer (101) to a communication line (115), and provides a network interface layer to the TCP/IP communication protocol of a communication function of the operating system of the computer (101). In this case, the communication line may be a wired LAN environment or a wireless LAN environment based on wireless LAN connectivity standards, for example, IEEE 802.11a/b/g/n.

Figure 2:
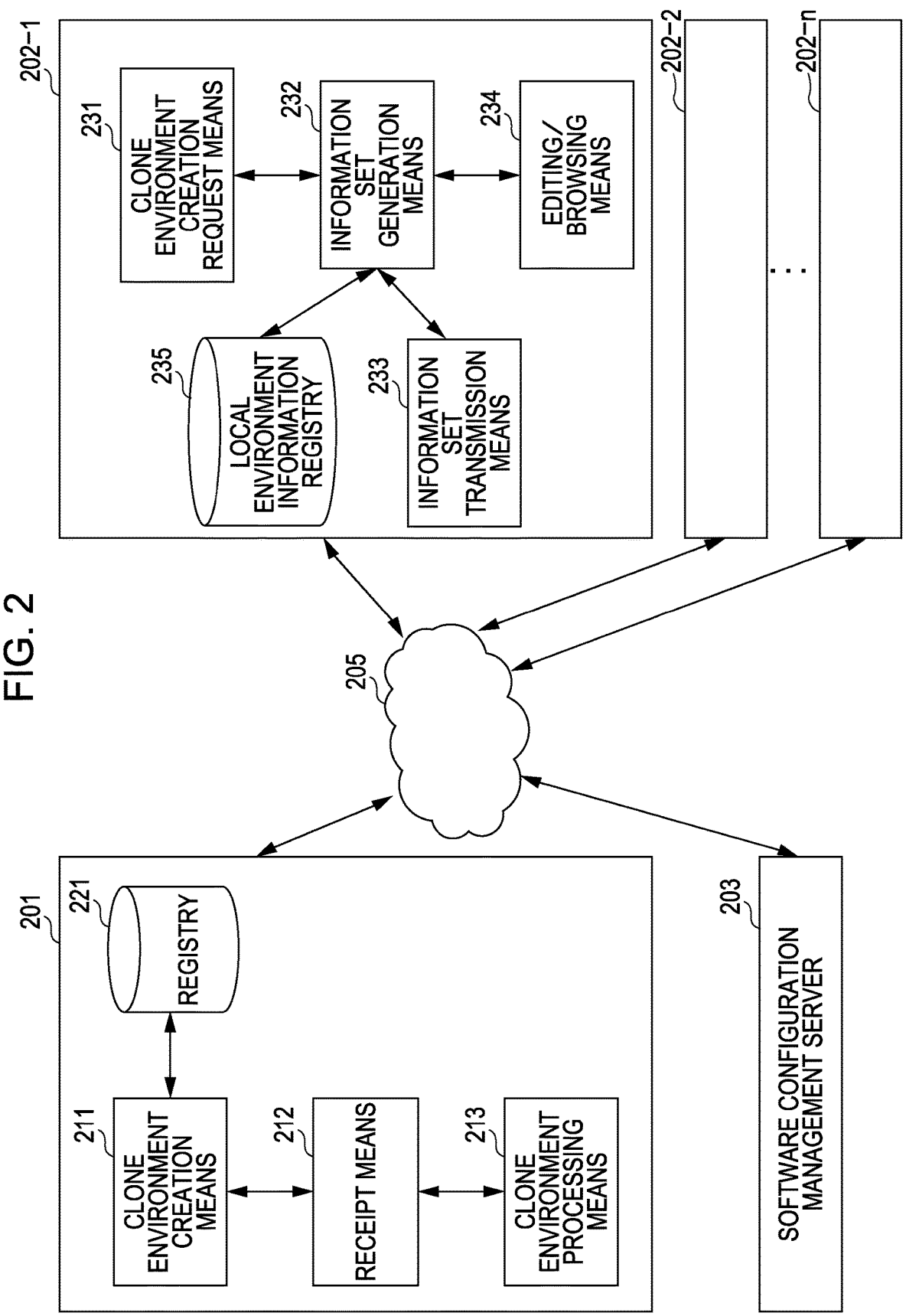
FIG. 2 illustrates a functional block diagram of servers and clients according to embodiments of the present invention, each of which may have the hardware functions of the computer hardware shown in FIG. 1.

FIG. 2 illustrates a functional block diagram of servers and clients according to embodiments of the present invention, each of which may have hardware functions of the computer (101) shown in FIG. 1. A server (201) is connected to a plurality of clients (202-1 to 202-n) via a network (205). Connections between the server (201), the clients (202-1 to 202-n), and the network (205) may be wired or wireless. The server (201) may be connected to one or more software configuration management (SCM) servers (203) via the network (205). The server (201) may also be configured to also have functions of the software configuration management server (203). For example, the server (201) may include a plurality of virtual logical partitions, and at least one of the virtual logical partitions may have functions of the SCM server.

The server (201), the plurality of clients (202-1 to 202-n), and the network (205) constitute a computing environment in certain embodiments of the present invention. The computing environment may be, for example, an integrated development environment, an office application collaboration environment, or an educational support collaboration environment. An integrated development environment is, for example, a collaboration framework. A collaboration framework may be, for example, Jazz (a trademark of IBM). Jazz is a new technology platform of IBM™ Rational for collaborative software delivery.

The server (201) includes, in addition to the CPU (102), the main memory (103) and the storage unit (108) shown in FIG. 1, clone environment creation means (211), receipt means (212), and clone environment processing means (213). The server (201) may further include a registry (221). In embodiments the storage unit (108) may also have functions of the registry (221).

The clone environment creation means (211) creates, on the server (201), a clone environment corresponding to a local environment held by a client (first client) in association with a user requesting creation of the clone environment. Creation of the clone environment can be performed, for example, upon receipt of a request for creation of the clone environment from the first client (202-1) or upon receipt of a notice of intent to participate in the clone environment from at least one other client (second client) different from the first client (202-1).

Moreover, in response to a request for creation of a clone environment, the clone environment creation means (211) may inquire of a predetermined client, whether the client participates in the clone environment. Upon receipt of a notice of intent to participate in the clone environment sent from the second client, the clone environment creation means (211) may inquire of the first client (202-1) whether the first client (202-1) permits the second client or a user in association with the second client, to participate in the clone environment. The clone environment creation means (211) may also retrieve, using information on the local environment held by the first client (202-1), components of a development environment for creating the clone environment from the SCM server (203) in association with the server (201) or a database (not shown) retaining components of a client environment on the basis of the information and merges components of the local environment of applications held by the first client (202-1) into the retrieved components.

When beginning to edit a file on the server (201), the clone environment creation means (211) may send the file name of the file to the first client (202-1) to acquire information in association with the sent file name from the first client (202-1), retrieves parameters corresponding to the retrieved information from the registry existing in the server (201), and then merge parameters of the local environment of the applications held by the first client (202-1) into the retrieved parameters.

The receipt means (212) receives a request for creation of a clone environment from the first client (202-1). The receipt means further receives a notice of intent to participate in the clone environment from the second client.

The clone environment processing means (213) enables the first client (202-1) and the second client to edit or browse content in the clone environment after the clone environment is created on the server (201). Moreover, the clone environment processing means (213) records a log of edit operations by the first client (202-1) and the second client. Simultaneous editing of content may be performed using, for example, Cola. Moreover, the user of the first client (202-1) and the user of the second client can communicate with each other in a collaboration environment such as a voice call or a shared whiteboard.

The clone environment processing means (213) is implemented by causing the first client (202-1) to switch the local environment on a screen of the first client (202-1) to the clone environment on the server (201) or causing the first client (202-1) to display, on the screen of the first client (202-1), a window of the clone environment on the server (201). The registry (221) stores clone environment information parameters corresponding to information on the local environment held by the first client (202-1).

Each of the clients (202-1 to 202-n) includes, in addition to, for example, the CPU (102), the main memory (103), and the storage unit (108) shown in FIG. 1, clone environment creation request means (231), information set generation means (232), information set transmission means (233), editing/browsing means (234), and a local environment information registry (235). In this example, the storage unit (108) may also have functions of the local environment information registry (235).

In embodiments, the client (202-1 to 202-n) may perform applications in the local environment thereof. In embodiments, the client (202-1 to 202-n) may also connect to a development server (not shown) via the network and perform applications on the development server in a manner similar to that in the local environment. In embodiments, "a local environment of applications to be performed on a client" includes the aforementioned two embodiments. The applications can include, for example, an integrated development environment application, an office application, and an educational support application.

In embodiments, the clone environment creation request means (231) requests the server (201) to create a clone or clone environment of the local environment of the client on the server (201). When the local environment of the client is, for example, an IDE, the request for creation of the clone environment is, for example, a request for pair programming. When the local environment of the client is, for example, an office application environment, the request for creation of the clone environment may be, for example, a request for joint editing or proofreading of a document. When the local environment of the client is, for example, an educational support environment, the request for creation of the clone environment may be, for example, a request for a personal lesson or coaching.

In embodiments the information set generation means (232) creates an area for storing an information set to be transferred to the server (201) in a memory of the client (202-1). The information set generation means (232) further acquires information to be transferred to the server (201) from the local environment of the client (202-1) (for example, the integrated development environment of the client).

The information set transmission means (233) may transmit an information set generated by the information set generation means (232) to the server (201).

The editing/browsing means (234) enables editing or browsing of an application in the local environment of a client. The editing/browsing means (234) may further enable editing or browsing of an application by a client in a clone environment created on the server (201). The local environment information registry (235) may store information on a local environment. The software configuration management (SCM) server (203) may include a server controlling and managing a software development project via the products of the project. The SCM may be configured to manage the change history of products such as documents or code to identify which version of each of the products corresponds to the version or revision of a product, and enable reproduction of a predetermined version of the product.

Figure 3:
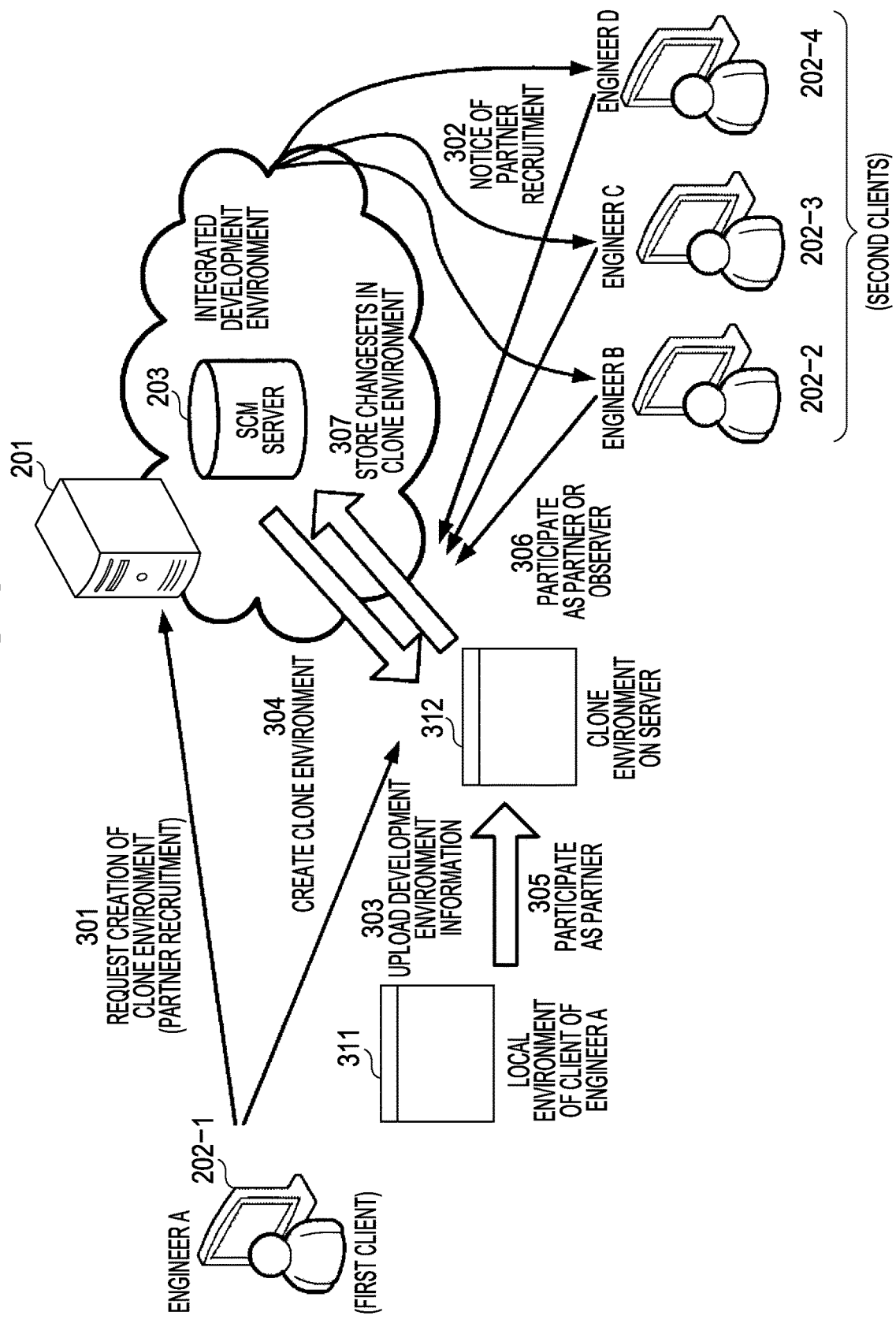
FIG. 3 is a schematic illustration of a computing environment according to embodiments of the present invention.

FIG. 3 is a schematic illustration of a computing environment according to embodiments of the present invention. FIG. 3 shows a server (201) connected to clients (202-1 to 202-4) via the network (not shown). The number of the clients (202-1 to 202-4) is exemplary and is not limited to that shown here. The server (201) may also be connected to the SCM server (203) via the network (not shown).

In FIG. 3, it is assumed that the client (202-1) is a client requesting creation of a clone environment (i.e., a first client), and each of the clients (202-2, 202-3, 202-4) is a client that may participate in the clone environment created on the server (201) in response to the foregoing request (i.e., a second client). The request for creation of the clone environment is, for example, recruitment for pair programming, a request for joint editing of an office application, or a request to start educational support.

When the request for creation of the clone environment is recruitment for pair programming, the respective users of the clients may be, for example, engineers A to D. When the request for creation of the clone environment is a request for joint editing of an office application, the user of the first client (202-1) may be, for example, a subordinate, and the user of the second client may be, for example, a superior. When the request for creation of the clone environment is a request to start educational support, the user of the first client (202-1) may be, for example, a student, and the user of the second client may be, for example, a teacher.

An embodiment regarding a request for creation of the clone environment that involves recruitment for pair programming is described as an example. Other embodiments are also plausible, for example, a case where the request for creation of the clone environment is a request for joint editing of an office application or a request to start educational support.

In FIG. 3, the engineer A of the first client (202-1) is performing program development on the local environment of the first client (202-1) and the first client (202-1) displays a screen (311) in the local environment on the first client on a display unit. Here, the engineer A considers performing pair programming and requests the server (201) to create a clone environment (301) where the request is also recruitment of a partner for pair programming. In this and other embodiments, the number of partners to be recruited may not be limited to one. In the case of pair programming, for example, in the request, information to be transferred from the first client (202-1) to the server (201) may be, for example, the outline of a task or a trouble report.

Referring back to FIG. 3, the server (201) may send, to the second clients (202-2, 202-3, 202-4) (i.e., the engineers B to D), a notice of partner recruitment from the engineer A, the notice sent for checking the intent to participate (302). The first client (202-1) may also send, directly to the second clients connected to an integrated development environment, a notice of partner recruitment from the engineer A, the sent notice checking the intent to participate, using the integrated development environment, which is not shown.

The first client (202-1) uploads, to the server (201), information on the local environment (for example, integrated development environment information) necessary to create the clone environment on the server (201) (303). The integrated development environment information may be, for example, baseline information and files having not been checked in. The server (201) retrieves, on the basis of the development environment information from the first client (202-1), components of a development environment for creating the clone environment from the SCM server (203) (repository) or the registry existing in the server (201) and creates the clone environment (304). The components of the development environment may be, for example, source files, binary library files, and settings of a build path.

As with the above paragraphs, in this and other embodiments, the first client (202-1) can participate in the clone environment created on the server (201) for pair programming (305). Also, any of the second clients (202-2, 202-3, 202-4) can notify the server (201) of the intent to participate as a partner or an observer in response to the notice of partner recruitment. Here, the first client (202-1) to participate can participate in the clone environment created on the server (201) for pair programming or as an observer (306). Each of the first client (202-1) and the second client participating for pair programming or as an observer can display a screen (312) in the clone environment on the server (201) on a display unit. Upon termination of pair programming, the server (201) can store changesets in the clone environment in the SCM server (203). The server (201) may also send changesets in the clone environment to the first client (202-1) as necessary and the first client (202-1) may merge the changesets sent from the server (201) into data in the local environment.

Figure 4:
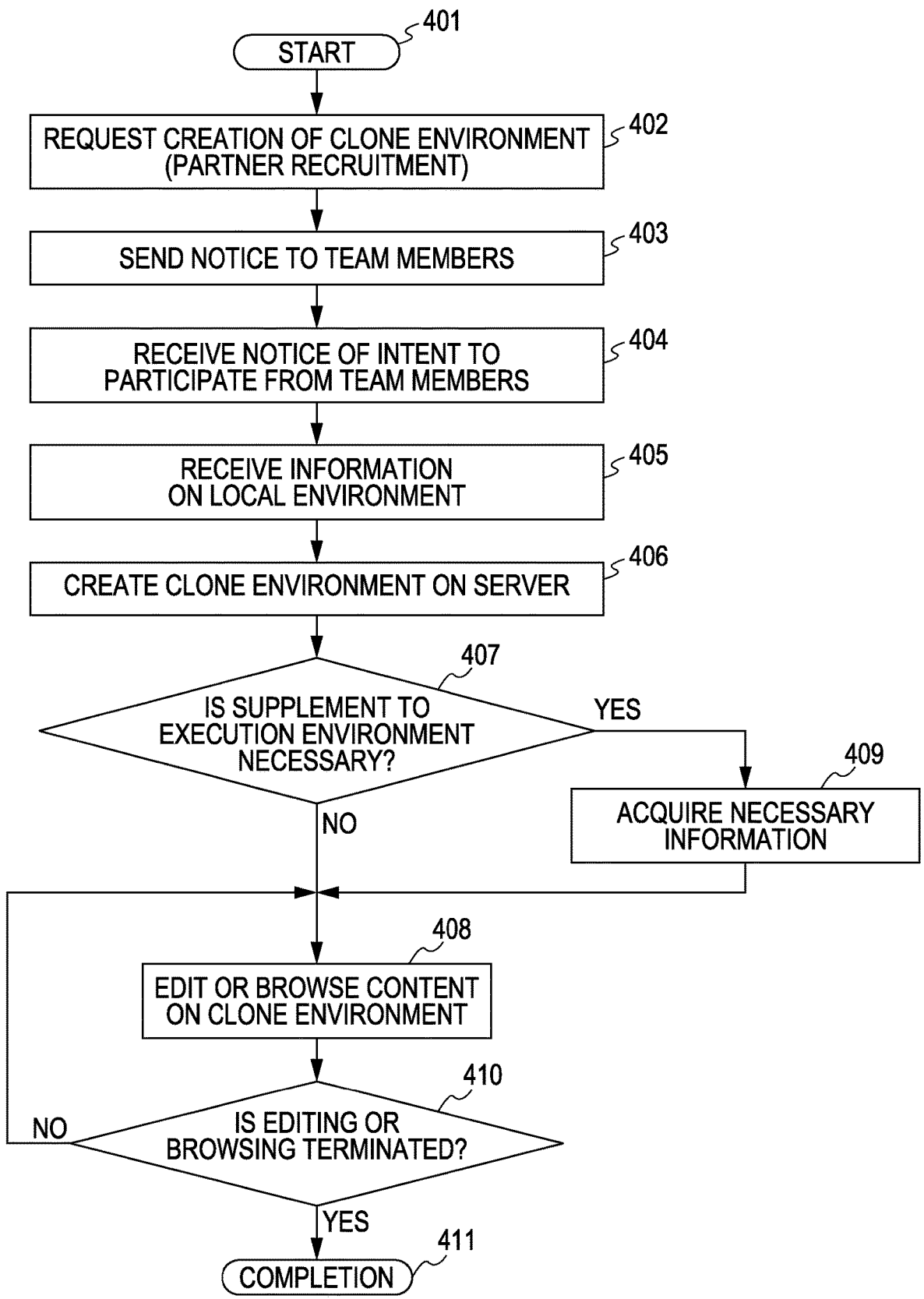
FIG. 4 illustrates a flowchart of a process of creating a clone environment on a server according to embodiments of the present invention.
Figure 11:
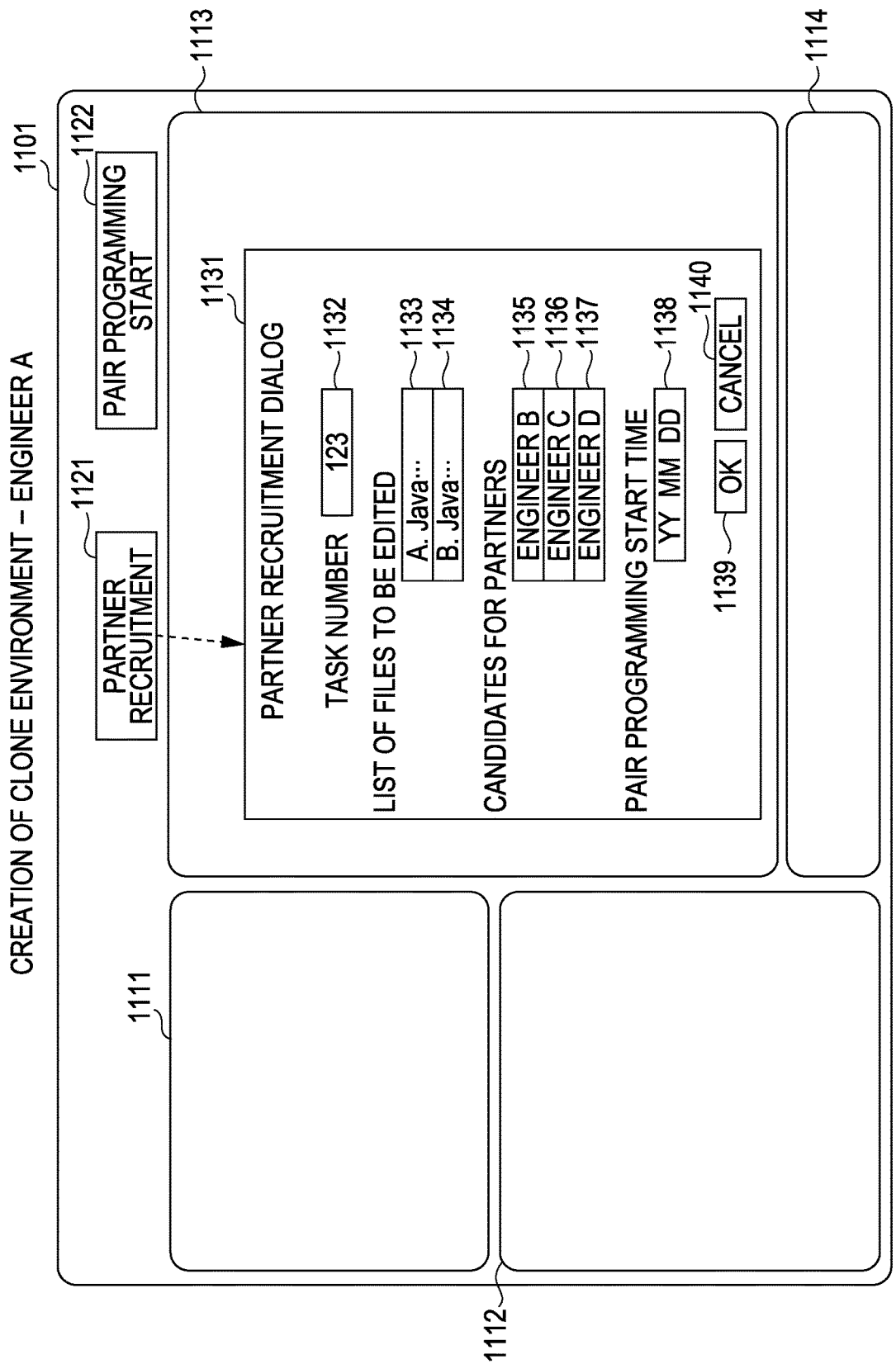
FIG. 11 illustrates an exemplary screen for requesting creation of a clone environment in a first client (engineer A) on a server according to embodiments of the present invention.

FIG. 4 illustrates a flowchart of a process for creating a clone environment on a server according to embodiments of the present invention. These steps of this process, as with all the processes described herein, may be completed in various orders, with different steps, and with more or less features and directions in each step. Thus, the embodiment, is illustrative. In step 401, the first client (202-1) waits for a user instruction to create a clone environment on the server (201). In step 402, the engineer A inputs a notice of intent to start pair programming through the screen of the first client (202-1) as shown in FIG. 11. In response to the input, the first client (202-1) requests the server (201) to create a clone environment on the server (201). In the request, the engineer A may specify a task number (for example, a Defect ID #), the respective names of files to be edited, and parts of source code, e.g., referring to a screen in FIG. 11. Moreover, the first client (202-1) may be configured so that a user can specify the respective names of engineers to be requested to participate in a cloning environment that may be created on the server. In association with the foregoing request, the first client (202-1) may send a task number, the respective names of files to be edited, parts of source code, and/or the respective names of engineers to be requested to participate specified by the user. The names of files to be edited can include, for example, the name of a source file subjected to pair programming and a path for the source file. Parts of source code can include, for example, a line, a paragraph, a chapter, a function name, and a block name. The names of engineers to be requested to participate can each include, for example, the identification ID of a corresponding engineer and the ID and IP address of a client used by the engineer.

In step 403, the server (201) inquires, of each of the respective clients of the engineers B to D who are team members, whether the client participates in pair programming. The first client (202-1) may also be configured to send, directly to the other clients (202-2, 202-3, 202-4) connected to an integrated development environment of the first client (202-1), an inquiry on whether to participate, bypassing the server (201) and using the integrated development environment. In this inquiry, an integrated development environment of each of the clients may be used to connect the first client (202-1) to the second clients (202-2, 202-3, 202-4).

The team members may be, for example, members specified by the first client (202-1), members belonging to the same project, members belonging to the same organization, members registered in the server (201) in advance, members having predetermined IP addresses, members in association with a task number from a user, or all members connected to the server (201). The foregoing inquiry may be made by, for example, displaying, e.g., a dialog on a screen—a screen of the integrated development environment—of each of the engineers, see FIG. 15, sending a request for participation to the mail address of the engineer, or putting a notice on, e.g., an electronic bulletin board that can be shared among the engineers (for example, a bulletin board on Lotus (a trademark of IBM) Notes). When accepting the foregoing request for participation, each of the clients of the team members having received the foregoing request for participation from the server (201) may send, to the server (201), a notice of intent to participate.

In step 404, the server (201) receives the foregoing notice of intent to participate from the client having accepted the foregoing request for participation. In step 405, when any client having accepted the foregoing request for participation exists, the server (201) sends, to the first client (202-1), a request to send information on the local environment of the first client (202-1). In response to the request from the server (201), the first client (202-1) may send the information on the local environment to the server (201). The first client (202-1) may also automatically send the information on the local environment to the server (201) upon making the request in step 402. The server (201) receives the information on the local environment from the first client (202-1).

In step 406, the server (201) retrieves clone environment creation parameters corresponding to the information on the local environment from the registry located in the server (201). The server (201) creates a clone environment using the retrieved clone environment creation parameters.

When the clone environment has been created, the first client (202-1) and the client having accepted the request for participation are ready to start pair programming using the clone environment created on the server (201). Before starting pair programming, the first client (202-1) may determine whether to permit the client having accepted the request for participation to participate in or perform browsing in pair programming. The determination may be individually made by the user or may be made from the content of an authorization table stored in the first client (202-1) in advance. Alternatively, the determination may be automatically made in a project management server so that a leader of a development project is permitted to participate by default.

In step 407, the server (201) determines whether a supplement to an execution environment in the cloning environment is necessary to perform an operation on a file to be edited. A case where a supplement to an execution environment is necessary represents, for example, a case where a file that is being edited by the engineer A depends on another file, and the other file has not been sent to the server. When no supplement to the execution environment is necessary, the server (201) causes the process to proceed to step 408. On the other hand, when a supplement to the execution environment is necessary, the server (201) can cause the process to proceed to step 409.

In step 408, the server (201) permits the first client (202-1) and the second client permitted by the first client (202-1) to participate (hereinafter also called the participating second client) to edit and browse content in the clone environment. Upon termination of editing, the first client (202-1) sends, to the server (201), a notice of intent to terminate pair programming. Upon termination of editing, the participating second client may send, to the server (201), a notice of intent to terminate pair programming.

In step 409, the server (201) acquires information necessary to supplement the execution environment from the first client (202-1) or the registry in the server (201). In step 410, the server (201) determines whether the server (201) has received the notice of intent to terminate pair programming from the first client (202-1) or the participating second client. When the server (201) has received the notice of intent to terminate pair programming, the process proceeds to step 411. On the other hand, when the server (201) has not received the notice of intent to terminate pair programming from the first client (202-1) and the participating second client, the process returns to step 408.

Figure 16:
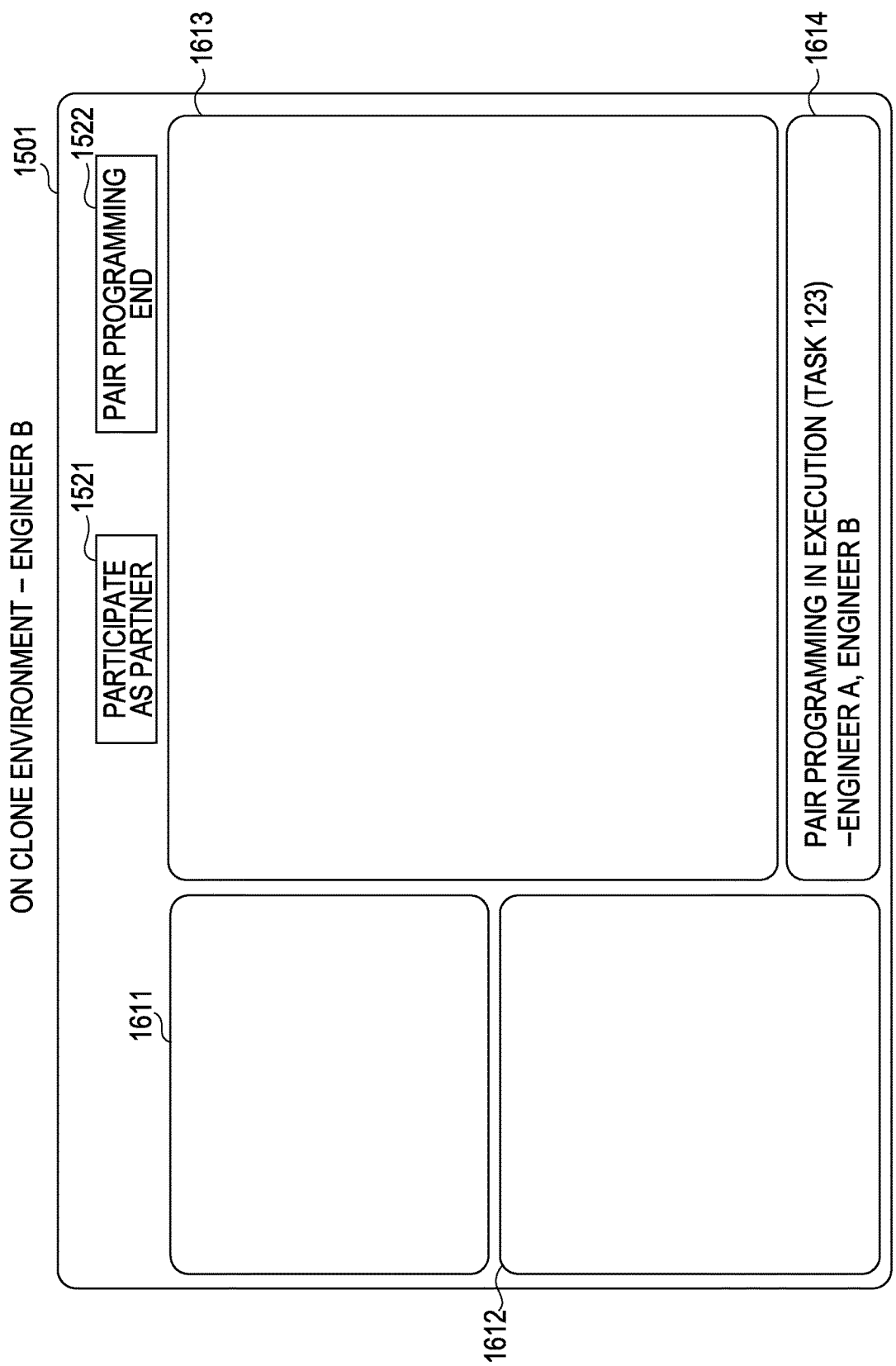
FIG. 16 illustrates an exemplary screen for editing or browsing content in a clone environment in the second client (engineer B) according to embodiments of the present invention.
Figure 17:
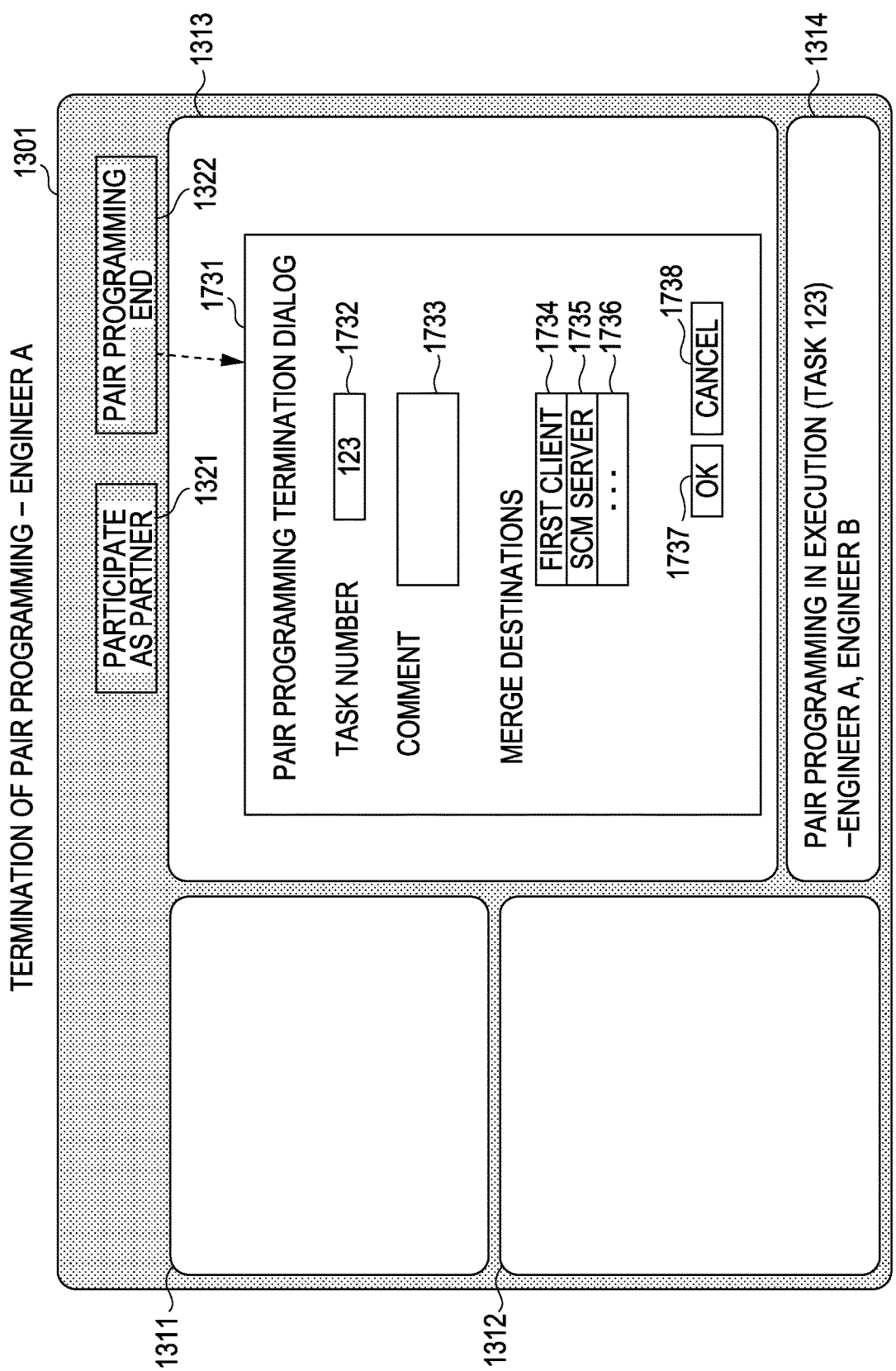
FIG. 17 illustrates an exemplary screen for terminating pair programming in a clone environment in the first client (engineer A) according to embodiments of the present invention.

In step 411, the engineer A inputs a notice of intent to terminate pair programming through the screen of the first client (202-1) (refer to FIG. 17). Upon receipt of the notice of intent to terminate pair programming from the first client (202-1), the server (201) terminates (i.e., completes) pair programming. Alternatively, in step 411, the engineer of the participating second client inputs a notice of intent to terminate pair programming through the screen of the second client (refer to FIG. 16). Upon receipt of the notice of intent to terminate pair programming from the participating second client, the server (201) terminates pair programming.

The server (201) records operations performed in the clone environment as a changeset. The changeset may be, for example, a log of operations. The server (201) further records information related to the operations performed in the clone environment. The information related to the operations may include, for example, information on clients having participated in pair programming (for example, IP addresses), user names, and the start or termination time of the operations. The server (201) registers the changeset in the SCM server (203). Moreover, the server (201) may send the changeset to the first client (202-1) as necessary. The first client (202-1) may receive the changeset from the server (201) and merge the changeset into corresponding data in the local environment.

Figure 5:
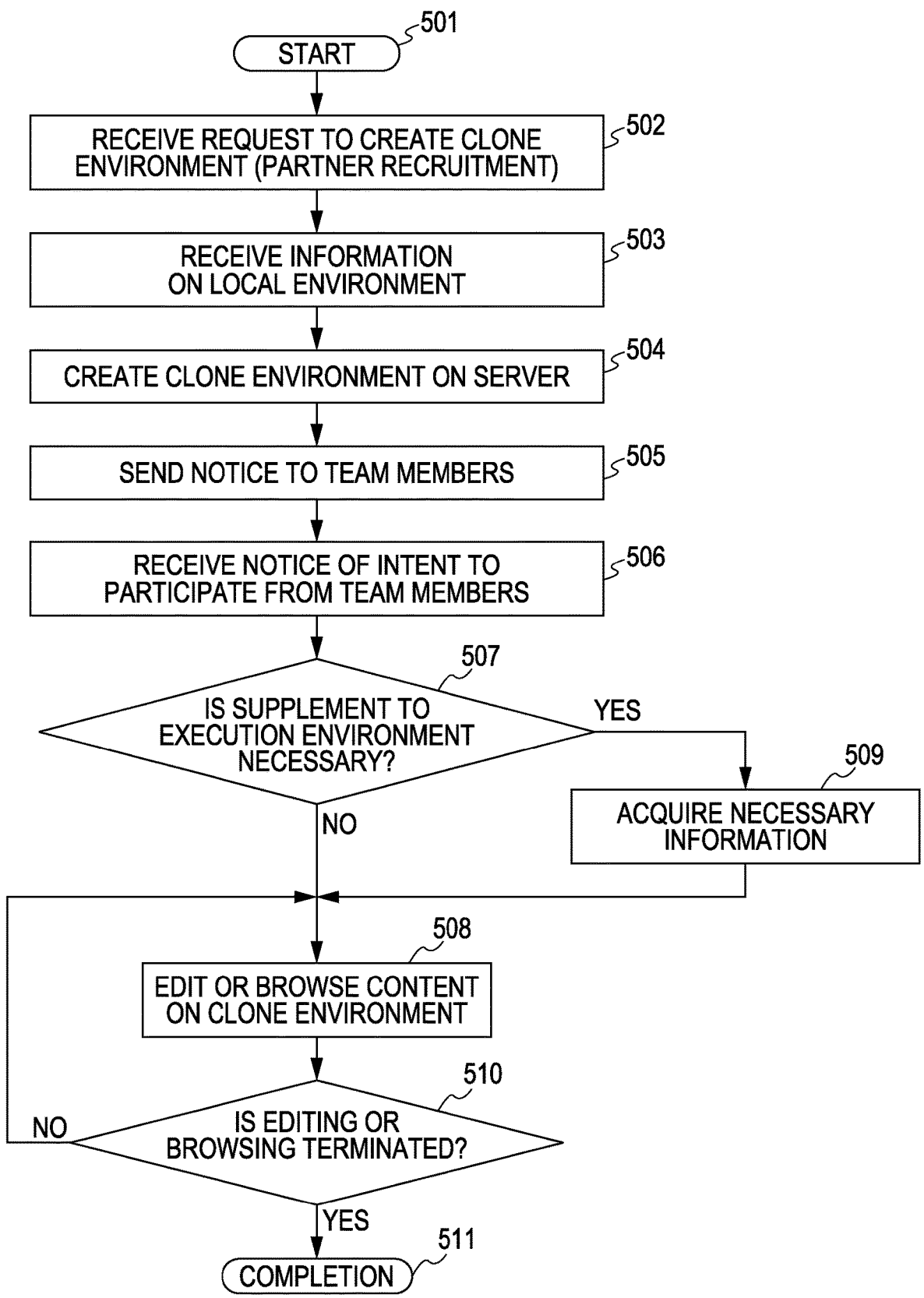
FIG. 5 illustrates a flowchart of a process of creating a clone environment on a server according to embodiments of the present invention.

FIG. 5 illustrates a flowchart of a process of creating a clone environment on a server according to embodiments of the present invention. FIG. 5 illustrates an embodiment (steps 503 to 506) in which a sequence of steps 403 and 404 and a sequence of steps 405 and 406 in FIG. 4 are in reverse order. A sequence of steps 501 and 502 and a sequence of steps 507 to 511 correspond to a sequence of steps 401 and 402 and a sequence of steps 407 to 411, respectively. Since step 501 corresponds to step 401, the description is omitted here.

In step 502, the first client (202-1) requests the server (201) to create a clone environment on the server (201). In association with the request, the first client (202-1) may send a task number, the respective names of files to be edited, parts of source code, and/or the respective names of engineers to be requested to participate specified by a user.

In step 503, upon receipt of the foregoing request, the server (201) sends, to the first client (202-1), a request to send information on the local environment of the first client (202-1). In response to the request from the server (201), the first client (202-1) may send the information on the local environment to the server (201). The first client (202-1) may also automatically send the information on the local environment to the server (201) upon making the request in step 502. The server (201) receives the information on the local environment from the first client (202-1).

In step 504, the server (201) retrieves clone environment creation parameters corresponding to the information on the local environment from the registry located in the server (201). The server (201) can create a clone environment of the local environment of the first client (202-1) using the retrieved clone environment creation parameters.

In step 505, upon creation of the clone environment on the server (201), the server (201) inquires of each of the respective clients of the engineers B to D who are team members whether the client participates in pair programming. When accepting the request for participation, each of the clients of the team members having received the request for participation from the server (201) may send, to the server (201), a notice of intent to participate. In step 506, the server (201) receives the notice of intent to participate from the client having accepted the request for participation. Since steps 507 to 511 respectively correspond to steps 407 to 411, the description is omitted here.

Figure 6:
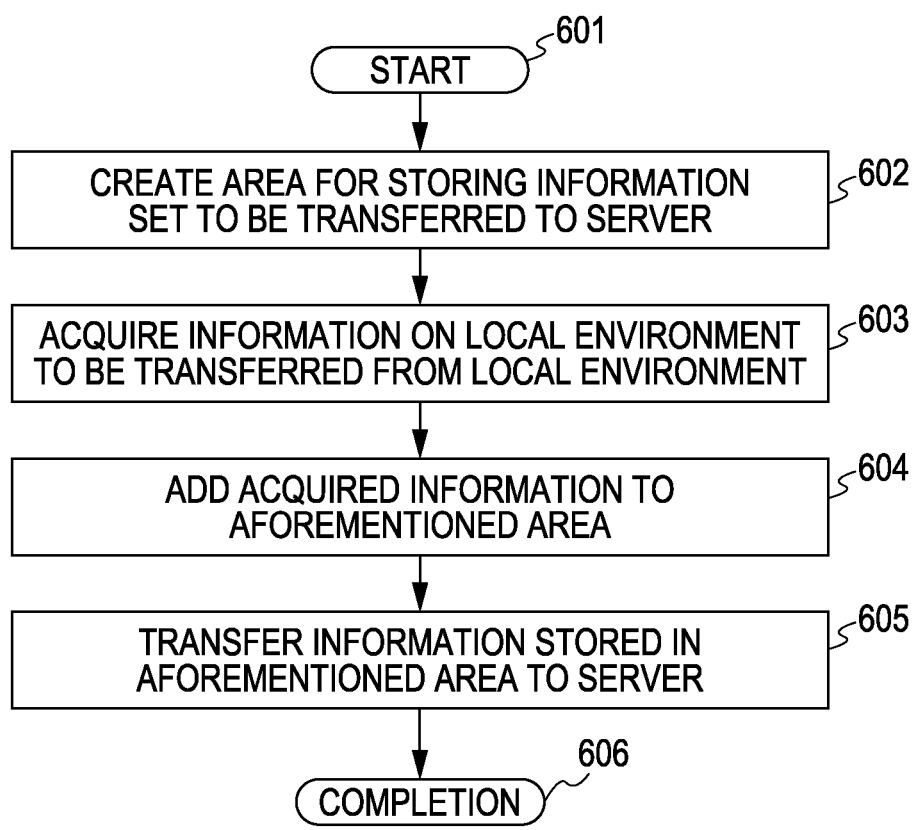
FIG. 6 illustrates a flowchart of a process of transferring information on the local environment of a client from the client to a server so as to create a clone environment on the server according to embodiments of the present invention.

FIG. 6 illustrates a flowchart of a process of transferring information on the local environment of a client from the client to a server so as to create a clone environment on the server according to embodiments of the present invention.

In the flowchart in FIG. 6, step 405 in FIG. 4 and step 503 in FIG. 5 are described in detail. Step 601 is started upon completion of step 404 in FIG. 4 or step 502 in FIG. 5. In step 602, the information set generation means (232) in the client (202-1) creates an area for storing an information set to be transferred to the server (201) in the memory of the client (202-1). The storage area may be, for example, a list. In step 603, the information set generation means (232) acquires, from the local environment of the client (for example, the integrated development environment of the client), information on the local environment to be transferred to the server (201) (hereinafter also called the information on the local environment). The information on the local environment may be acquired from, for example, the integrated development environment of the engineer A. The information on the local environment can include, for example, the runtime information of the integrated development environment, the baseline information of files, documents, or code to be used in applications, and private file information. The runtime information of the integrated development environment can include, for example, the type of the integrated development environment, the version of a virtual machine (for example, JVM), and an SCM server name. The baseline information of files, documents, or code to be used in applications can include, for example, the version management information of files, documents, or code subjected to pair programming. Moreover, the baseline information may be, for example, SCM baseline information. Private file information includes information on private files included in a specified part (for example, a specific part such as a line, a function, and a block of source code) and information on private files related to the specified part in the integrated development environment of the engineer A. Private file information can be, for example, information on files that do not exist in a collaboration framework server or information on files having not been checked in after being added to, e.g., the SCM server (203). Private file information can also include, for example, source or libraries related to a part of a task or source specified by a user, out of, e.g., source or libraries in the integrated development environment of the engineer A.

In step 604, the information set generation means (232) adds the acquired information on the local environment to the area created in step 602. In step 605, the information set transmission means (233) transfers the information stored in the area to the server (201). In step 606, upon completion of the foregoing transfer, the client (202-1) terminates the process of transferring the information on the local environment.

Figure 7:
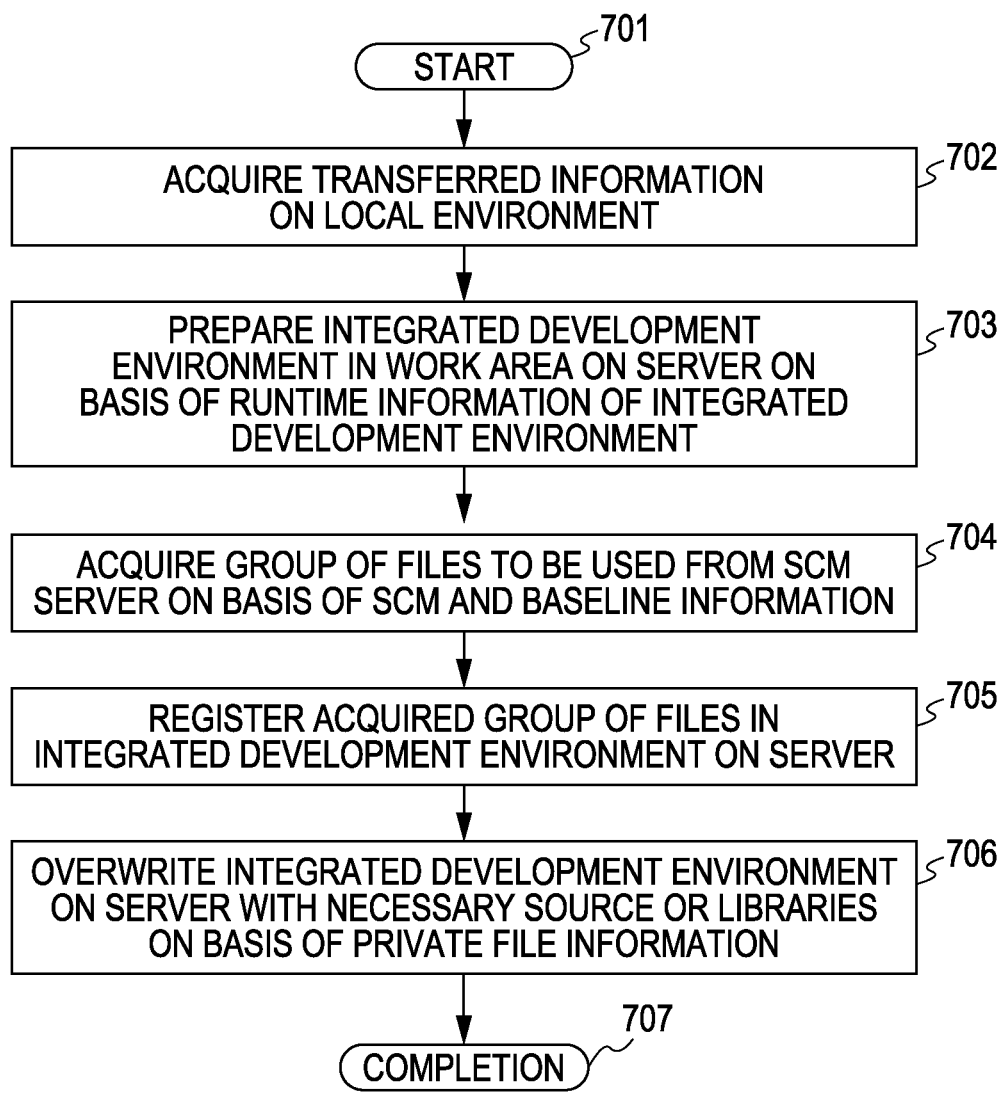
FIG. 7 illustrates a flowchart of a process of creating a clone environment on a server according to embodiments of the present invention.

FIG. 7 illustrates a flowchart of a process of creating a clone environment on a server according to embodiments of the present invention. In the flowchart in FIG. 7, step 406 in FIG. 4 and step 504 in FIG. 5 are described in detail. Step 701 is started upon completion of step 606 in FIG. 6. In step 702, the receipt means (212) in the server (201) acquires information on a local environment transferred from the first client (202-1) according to the flowchart shown in FIG. 6. In step 703, the clone environment creation means (211) in the server (201) prepares an integrated development environment in a work area in the server (201) on the basis of the runtime information of the integrated development environment out of the transferred information on the local environment. In embodiments, the server (201) may use the integrated development environment using, for example, a virtual machine by the cloud.

In step 704, the clone environment creation means (211) acquires a group of files to be used from the SCM server (203) or a server (not shown) managing source files or documents on the basis of SCM and baseline information out of the transferred information on the local environment. The group of files to be used can include, for example, source files, documents, and binary library files. In step 705, the clone environment creation means (211) registers the group of files acquired from the SCM server (203) in the integrated development environment prepared in the work area in the server (201).

In step 706, the clone environment creation means (211) acquires necessary source or libraries from the SCM server (203) on the basis of private file information out of the transferred information on the local environment and overwrites the integrated development environment on the server (201) with the acquired source or libraries. When the overwriting files are managed by the SCM server (203), the files are checked out as necessary. In step 707, the server (201) terminates the process of creating the clone environment on the server (201).

Figure 8:
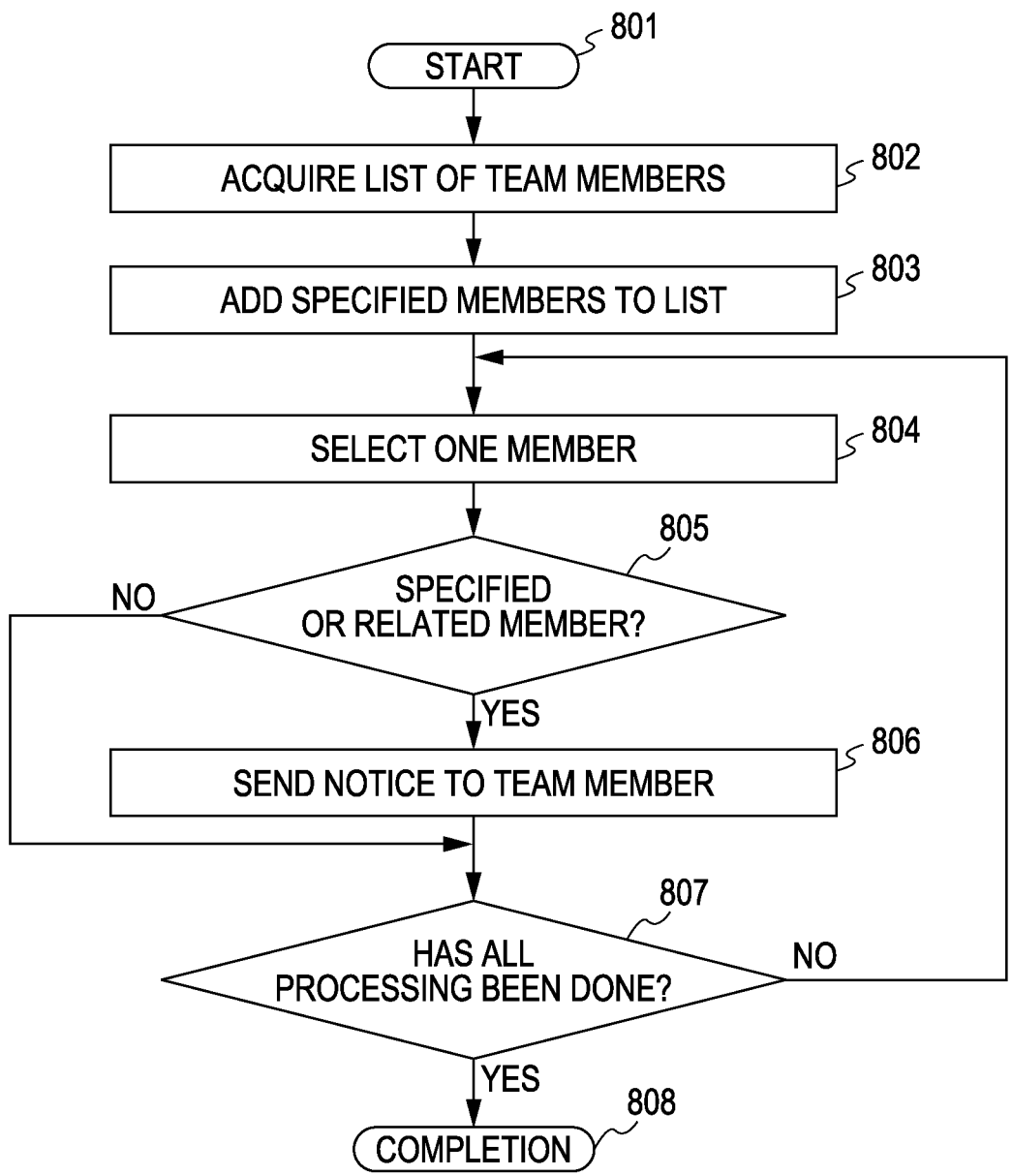
FIG. 8 illustrates a flowchart of a process of sending a notice inquiring about the intention to participate in a clone environment created on a server according to embodiments of the present invention.

FIG. 8 illustrates a flowchart of a process of sending a notice inquiring about the intention to participate in a clone environment created on a server according to embodiments of the present invention. In the flowchart in FIG. 8, step 403 in FIG. 4 and step 505 in FIG. 5 are described in detail. In step 801, the server (201) starts the process of sending a notice inquiring about the intention to participate in a clone environment created on the server (201). The first client (202-1) may start the process of sending a notice inquiring about the intention to participate in the clone environment using an integrated development environment.

In step 802, the server (201) acquires a list of team members to whom a notice inquiring about the intention to participate in a clone environment created on the server (201) is sent. The list may be provided from the first client (202-1), or the server (201) may have a list of team members for the first client (202-1) in advance.

In step 803, when the engineer A who is a user of the first client (202-1) specifies team members for pair programming, the server (201) records the specified members in the list of team members in step 802.

In step 804, the server (201) selects a member from the list of team members in step 802 or the team members specified in step 803. When the members are in association with priorities in the list of team members, the server (201) selects a member according to the priorities. When the members are not in association with priorities in the list of team members, the server (201) selects a member, for example, in alphabetical order of member names, in alphabetical order of organization names, or in alphabetical order of group names.

In step 805, the server (201) determines whether the selected member is specified by the engineer A or has a relation with the engineer A. The relation may be determined, for example, in a manner that depends on whether the member relates to the engineer A in a project or relates to information (for example, a task) specified by the engineer A. When the selected member is specified by the engineer A or has a relation with the engineer A, the server (201) causes the process to proceed to step 806. On the other hand, when the selected member is not specified by the engineer A and has no relation with the engineer A, the server (201) causes the process to proceed to step 807.

In step 806, the server (201) sends a notice inquiring about the intention to participate in a clone environment that has been created or may be created on the server (201) to the member.

In step 807, the server (201) determines whether all the members in the list of team members in step 802 or all the team members specified in step 803 have been processed. When all the members have been processed, the server (201) causes the process to proceed to step 808. When all the members have not been processed, the server (201) causes the process to return to step 804. In step 808, the server (201) terminates the process of sending a notice inquiring about the intention to participate in the clone environment created on the server (201).

In FIG. 8, an embodiment in which the server (201) individually sends a notice to team members is described. In another embodiment, the server (201) may be configured to send a notice to all team members at the same time for each specific range of IP addresses, each specific organization (for example, a company organization), or each specific group (for example, a team or a project).

Figure 9:
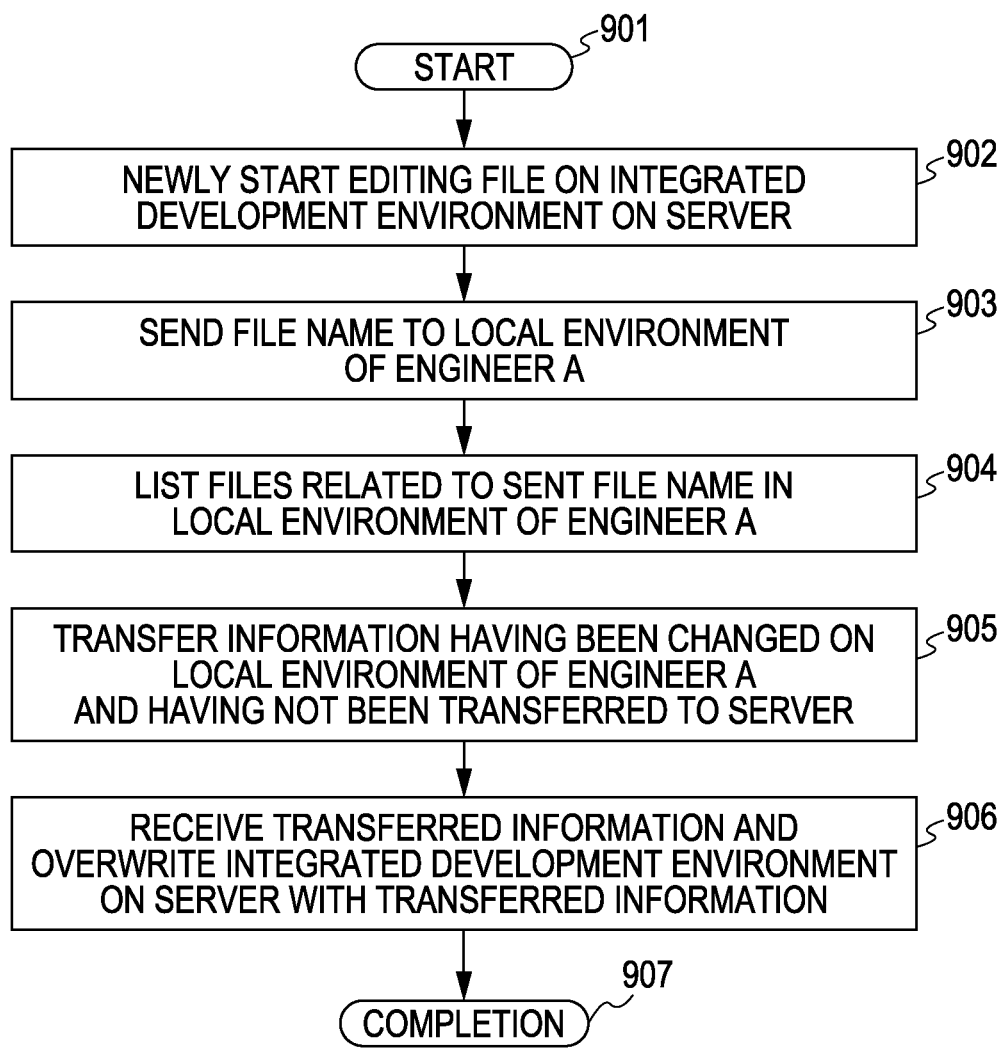
FIG. 9 illustrates a flowchart of a process of supplementing a clone environment created on a server according to embodiments of the present invention.

FIG. 9 illustrates a flowchart of a process of supplementing a clone environment created on a server according to embodiments of the present invention. In the flowchart in FIG. 9, step 407 in FIG. 4 and step 507 in FIG. 5 are described in detail. In the middle of newly editing content or editing content, when files and the like having not been incorporated in a clone environment created according to the flowchart in FIG. 7 are necessary in the editing, the clone environment may be supplemented.

In step 901, the clone environment creation means (211) in the server (201) starts the process of supplementing a clone environment created on the server (201). In step 902, the first client (202-1) or a second client permitted by the first client (202-1) to participate newly starts editing content, for example, a file, in the clone environment. When editing of a file has been started and when the clone environment needs to be supplemented, until the process of supplementing the clone environment is terminated in step 907, the editing operation remains pending. When the clone environment need not be supplemented, the process of supplementing the clone environment is terminated or waits in the background of the server (201) until the clone environment needs to be supplemented.

In step 903, the clone environment creation means (211) sends, to the local environment of the engineer A (i.e., the local environment of the first client (202-1)), the name of the file having started to be newly edited. In step 904, the first client (202-1) lists pieces of information related to the name of the file sent from the server (201) in the local environment of the first client (202-1). The first client (202-1) acquires the pieces of related information from, for example, the registry in the first client (202-1). The first client (202-1) checks whether the pieces of related information are changed in the local environment of the first client (202-1). Being changed in the local environment can mean that, for example, a version of the file identified by baseline is changed. When the pieces of related information are changed, the process proceeds to step 904. On the other hand, when the pieces of related information are not changed, the process of supplementing the clone environment is terminated or waits in the background of the server (201) until the clone environment needs to be supplemented. This is because, since there is no change in the local environment of the first client (202-1), even when the pieces of related information are not sent from the first client (202-1) to the server (201), the pieces of related information in the first client (202-1) are the same as pieces of information acquired by the server (201) from the SCM server (203).

In step 905, the first client (202-1) transfers, to the server (201), the foregoing pieces of information having been changed in the local environment of the engineer A and having not been transferred to the server (201). The reason why pieces of information meeting such conditions are transferred to the server is because, when a clone environment is created on the server (201) for the first time, all pieces of information being changed in the local environment of the engineer A are not necessarily transferred to the server (201). For example, when the file having started to be edited on the server (201) corresponds to a file being changed in the local environment of the engineer A, the pieces of information having not been transferred to the server (201) are the file having started to be edited or the difference of the file, or a file related to the file. The related file may depend on a file, e.g., MakeFile for building, in which the dependent relationship between the foregoing file having started to be edited and another file is described.

In step 906, the receipt means (212) receives the foregoing pieces of information from the first client (202-1). The clone environment creation means (211) acquires the received pieces of information or pieces of information specified in the received pieces of information from a registry of the clone environment on the server (201). The clone environment creation means (211) updates the clone environment by overwriting an integrated development environment prepared on the server (201) with the received pieces of information or the acquired pieces of information. The clone environment created on the server is supplemented by this updating so that the foregoing content having started to be newly edited can be edited.

In step 907, the server (201) terminates the process of supplementing the clone environment created on the server (201). Upon termination of the process, the first client (202-1) and the second client permitted by the first client (202-1) to participate can edit content at the same time in the clone environment.

Figure 10:
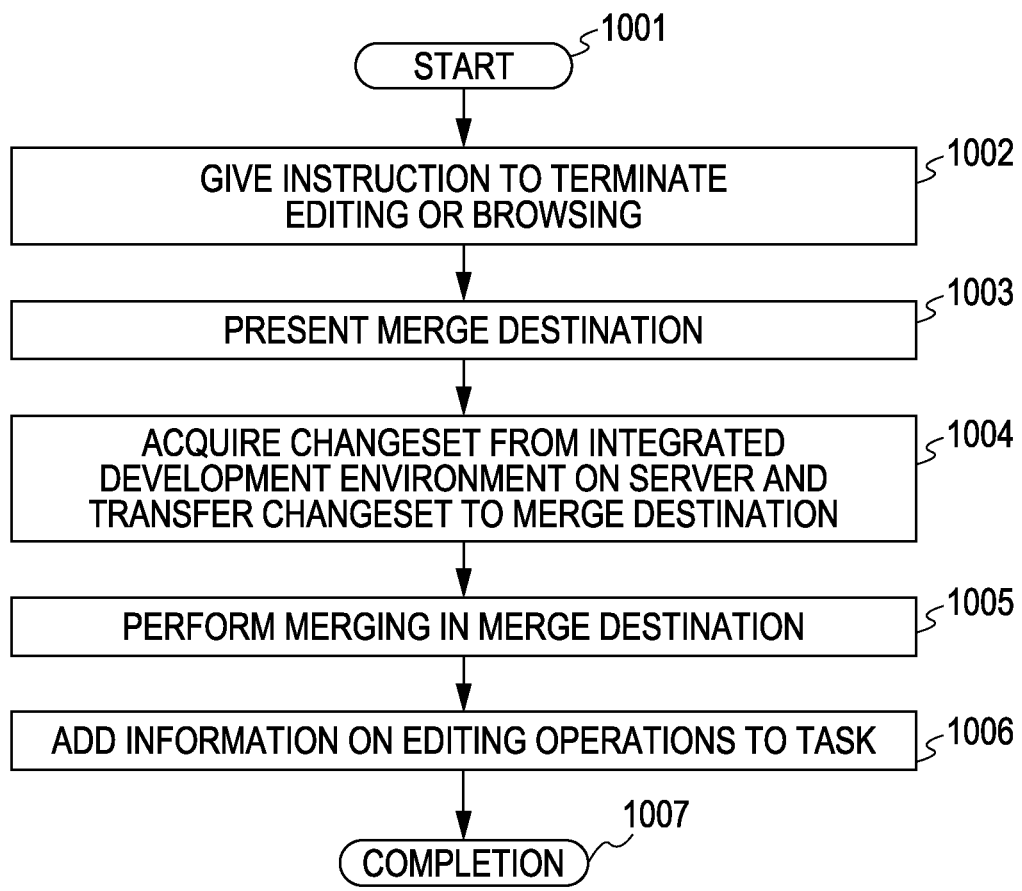
FIG. 10 illustrates a flowchart of a process of terminating pair programming according to embodiments of the present invention.

FIG. 10 illustrates a flowchart of a process of terminating pair programming according to embodiments of the present invention. As with each of the flowchart embodiments, the steps may be performed in various orders, with more or fewer or different steps, and with more or less features in each step.

In the flowchart in FIG. 10, step 410 in FIG. 4 and step 510 in FIG. 5 are described in detail. In step 1001, the server (201) starts the process of terminating pair programming. The process can be started by, for example, the engineer A clicking a "pair programming end" button displayed on the screen of the first client (202-1) with a mouse or the like (refer to 1322 in FIG. 13, 1422 in FIGS. 14, and 1322 in FIG. 17). The process can also be started by the engineer B clicking the "pair programming end" button displayed on the screen of the second client (202-2) with a mouse or the like (refer to 1522 in FIG. 16).

In step 1002, the first client (202-1) receives an instruction to terminate editing or browsing of content from the engineer A. Upon receipt of the instruction, the first client (202-1) can transfer the instruction to terminate editing or browsing of the content to the server (201). In the termination, an arrangement may be made so that the consent of another engineer participating in editing or browsing of the content is required. In such a case, upon receipt of the instruction to terminate editing or browsing of the content from the first client (202-1), the server (201) may notify the second client participating in a clone environment that the engineer A has sent the instruction to terminate editing or browsing of the content.

In step 1003, the first client (202-1) receives presentation of a destination into which a changeset in the clone environment is merged from the engineer A. A plurality of merge destinations may be specified. Upon receipt of the presentation of the merge destination, the first client (202-1) notifies the server (201) of the merge destination. The presentation of the merge destination in step 1003 may be given in parallel with the instruction in step 1002. That is, the first client (202-1) may be configured to receive the instruction to terminate editing or browsing of the content and the presentation of the destination, into which the changeset is merged, from the engineer A at the same time. In such a case, upon receipt of the foregoing instruction and the presentation of the merge destination, the first client (202-1) notifies the server (201) of the instruction to terminate editing or browsing of the content and the merge destination.

In step 1004, the server (201) acquires the changeset from an integrated development environment that is the clone environment on the server (201) and transfers the changeset to the merge destination. In step 1005, in the transfer destination, the changeset is merged. When the merge destination is the first client (202-1), the first client (202-1) may merge the changeset into data (for example, source files) of the local environment. When the merge destination is the SCM server (203), the SCM server (203) may be configured to be capable of performing, for example, check-out, merging, and check-in as necessary.

In step 1006, the server (201) adds information on editing operations to a task (for example, a CM task). The information on editing can include, for example, the identifier (ID) of each participant, e.g., the name or management number of the second client or the user of the second client, and the start time and termination time of the operations.

In step 1007, the server (201) terminates the process of terminating pair programming. Even after terminating pair programming, the clone environment on the server (201) may be stored so as to verify a series of changes by each client. In such a case, the server (201) may be synchronized with the local environment of the first client (202-1) as appropriate. Moreover, upon termination of pair programming, on the screen of the first client (202-1), the screen of the clone environment (for example, refer to FIG. 13 described below) is automatically switched to the screen of the local environment (for example, refer to FIG. 11 described below). Alternatively, upon termination of pair programming, a window of the clone environment, e.g., refer to FIG. 14 described below, disappears from the screen of the first client (202-1).

FIG. 11 illustrates an exemplary screen for requesting creation of a clone environment in the first client (the engineer A) on a server according to embodiments of the present invention. FIG. 11 illustrates a screen (1101) of the client (202-1) of the engineer A. The screen (1101) represents an editing screen for an IDE application. It is assumed in this embodiment that the engineer A needs to recruit for pair programming, e.g., request creation of a clone environment on a server. The engineer A clicks a "partner recruitment" button (1121) on the screen (1101) with, for example, a mouse. In response to this operation, a partner recruitment dialog window (1131) appears on the screen (1101). The partner recruitment dialog window (1131) can include, for example, a dialog box (1132) for specifying the task number of an IDE application, dialog boxes (1133 and 1134) for selecting files to be edited, dialog boxes (1135 to 1137) for specifying candidates for partners, a dialog box (1138) for specifying a pair programming start time, an "OK" button (1139), and a "cancel" button (1140). The engineer A can specify a task number in the dialog box (1132). Moreover, the engineer A can enter or specify a file to be subjected to pair programming and edited in the dialog box (1133). Moreover, for example, a line of source code may be specified using, e.g., a dialog for browsing a source file. Moreover, the engineer A can enter or specify candidates for partners performing pair programming. In this entry or specification, an arrangement may be made so that the engineer A can not only directly enter the name of each engineer, but also select a team name, a group name, or an organization name. Moreover, the engineer A may specify a pair programming start time. In this case, the engineer A may specify a pair programming start time, separately using a schedule management function or a calendar function of an integrated development environment. A notice of partner recruitment is sent from the client (202-1) of the engineer A to the server (201) by the engineer A pressing the "OK" button after entering or specifying a task number, files to be edited, candidates for partners, and/or a pair programming start time. Then, a clone environment identical to a current workspace of the client (202-1) may be created on the server (201). In the creation of the clone environment, baseline used in the current workspace of the client (202-1) and the information of files specified in the list of files to be edited may be used.

Figure 12:
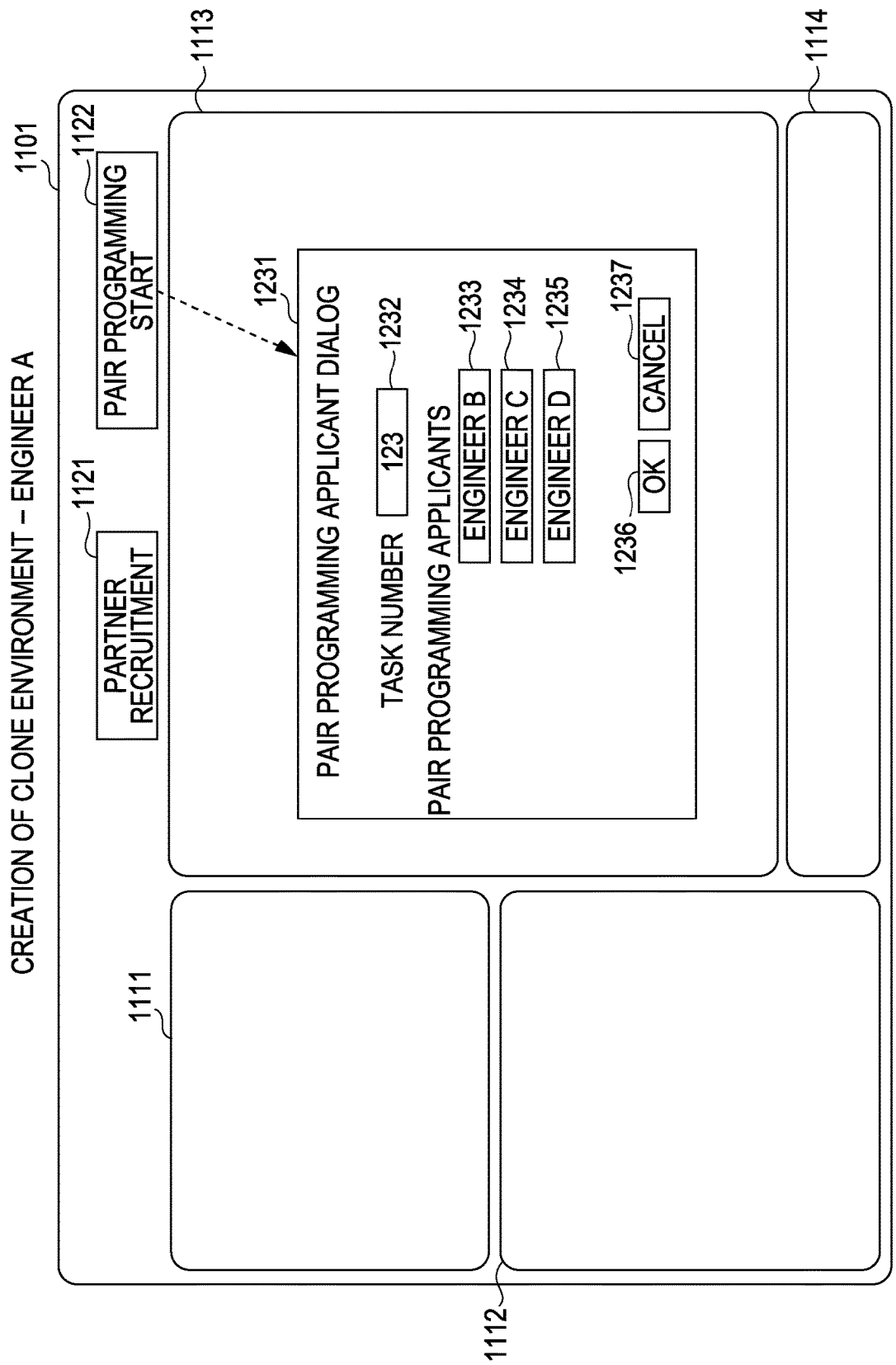
FIG. 12 illustrates an exemplary screen for permitting partners to perform pair programming in a clone environment in the first client (engineer A) according to embodiments of the present invention.

FIG. 12 illustrates an exemplary screen for permitting partners to perform pair programming in a clone environment in the first client (the engineer A) according to embodiments of the present invention. FIG. 12 illustrates the screen (1101) of the client (202-1) of the engineer A. The screen (1101) includes a pair programming applicant dialog (1231). In this case, it is assumed that the engineer B (202-2), the engineer C (202-3), and the engineer D (202-4) have made an application in response to partner recruitment from the engineer A. The pair programming applicant dialog (1231) presents, to the engineer A, dialog boxes (1233, 1234, and 1235) for allowing the engineer A to select a partner for pair programming from the engineer B (202-2), the engineer C (202-3), and the engineer D (202-4). The engineer A can permit all or some (for example, the engineers B and D) of the applicants to perform pair programming or can reject all of the applicants regarding pair programming. It is now assumed that the engineer A desires pair programming with the engineer B. Information stating that a permitted partner (i.e., a partner performing pair programming) is the engineer B is sent from the client (202-1) of the engineer A to the server (201) by the engineer A clicking the dialog box (1233) with, e.g., a mouse and pressing an "OK" button. Then, the server (201) notifies the computer (202-2) in association with the engineer B that pair programming can be started. On the other hand, regarding the engineers C and D who are not selected by the engineer A, the server (201) notifies the computers (202-3 and 202-4) in association with the engineers C and D that starting of pair programming is rejected.

Figure 13:
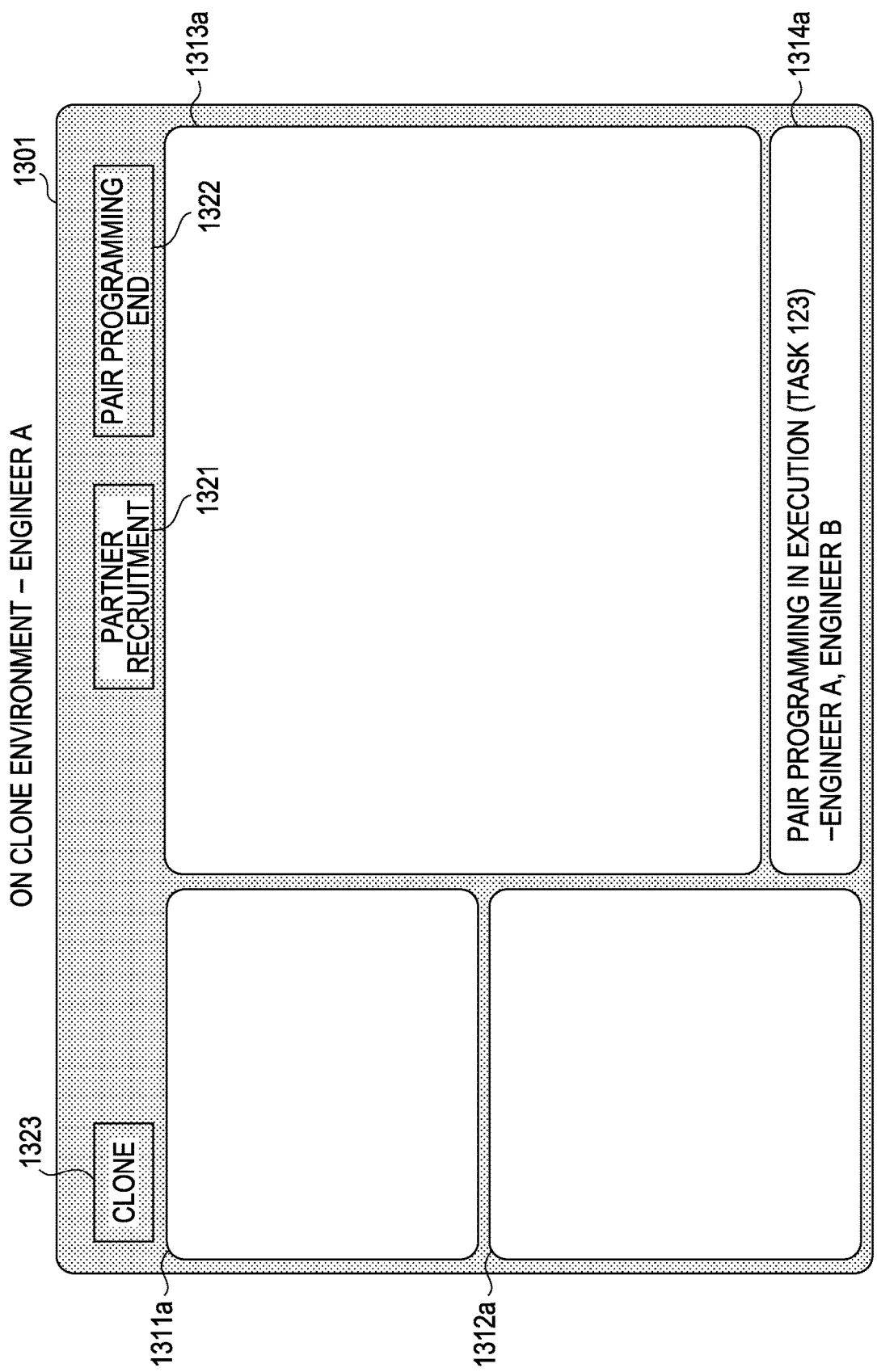
FIG. 13 illustrates an exemplary screen (having replaced the screen of a local environment) for editing or browsing content in a clone environment in the first client (engineer A) according to embodiments of the present invention.

FIG. 13 illustrates an exemplary screen (having replaced the screen of a local environment) for editing or browsing content in a clone environment in the first client (the engineer A) according to embodiments of the present invention. FIG. 13 illustrates a screen of the client (202-1) of the engineer A. This screen represents a case where the editing screen (1101) for a local IDE application (hereinafter also called an editing screen in a local environment) is replaced with an editing screen (1301) for an IDE application in a clone environment created on the server (201) (hereinafter also called an editing screen in a clone environment). The editing screen (1301) in the clone environment may include an indicator (1323) indicating a clone so as to show the engineer A that the screen is the editing screen (1301) in the clone environment. Alternatively, it may be shown to the engineer A, by making the background color of the editing screen (1301) in the clone environment different from the background color of the editing screen (1101) in the local environment, that the screen is the editing screen (1301) in the clone environment.

Moreover, the editing screen (1301) in the clone environment may show that pair programming is being executed and a task to be edited in pair programming is "123" and indicate the respective names of engineers performing pair programming (1314a).

In pair programming, a change to code may be sent from a client having made the change to the server (201). The server (201) can store the content of changes sent from each client as an editing log.

Figure 14:
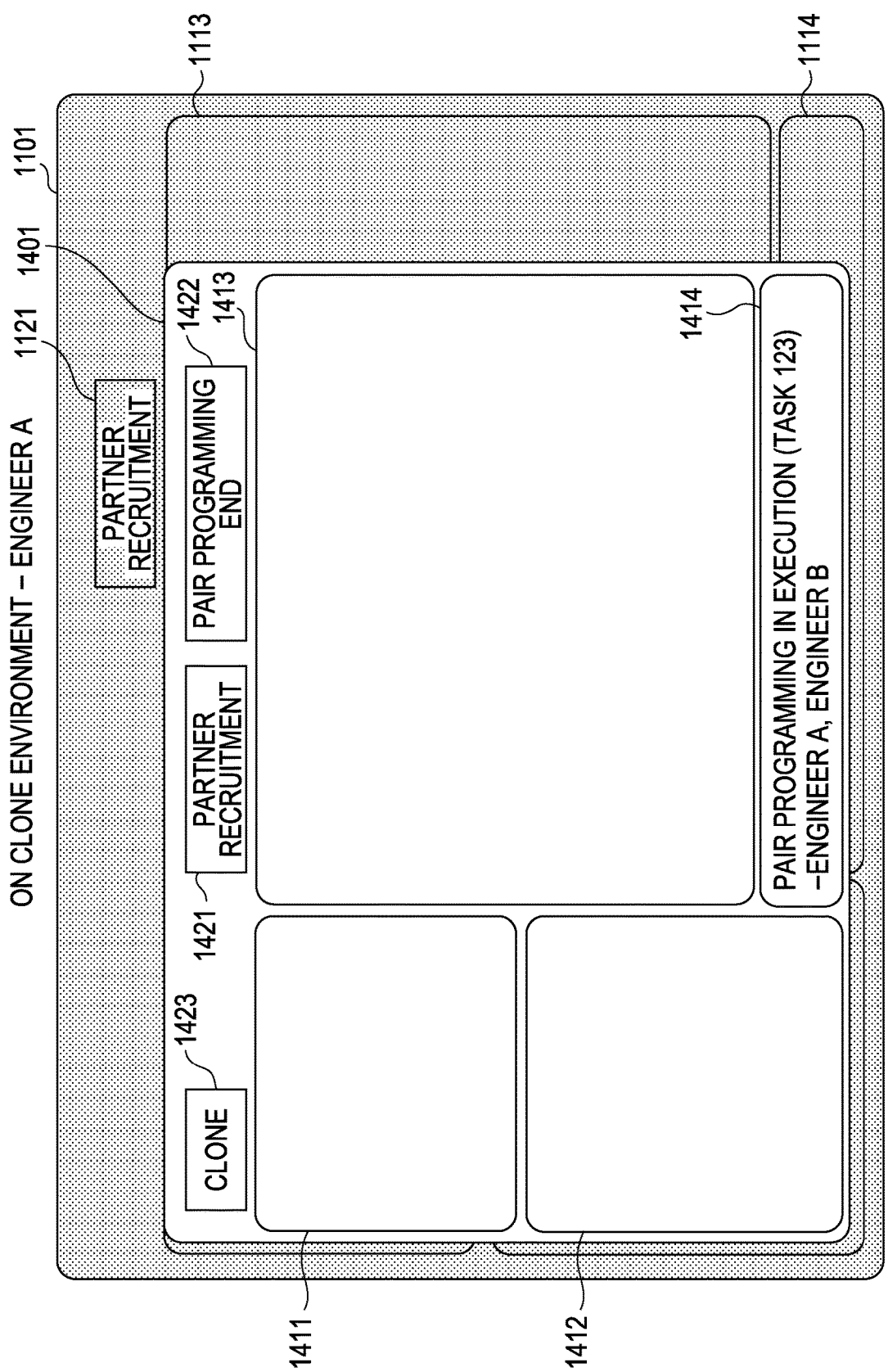
FIG. 14 illustrates an exemplary screen (being displayed in a separate window) for editing or browsing content in a clone environment in the first client (engineer A) according to embodiments of the present invention.

FIG. 14 illustrates an exemplary screen (being displayed on a separate window) for editing or browsing content in a clone environment in the first client (the engineer A) according to embodiments of the present invention. FIG. 14 illustrates a screen of the client (202-1) of the engineer A. In this screen, a window (1401) of an editing screen for an IDE application in a clone environment created on the server (201) (an editing screen in a clone environment) is separately displayed on the window (1101) of the editing screen for an IDE application in the local environment of the engineer A (an editing screen in a local environment). The editing screen in the clone environment may include an indicator (1423) indicating a clone so as to show the engineer A that the window is the window of the editing screen (1401) in the clone environment. Alternatively, it may be shown to the engineer A, by making the background color of the editing screen (1401) in the clone environment different from the background color of the editing screen in the local environment, which of the screens the current screen is.

In embodiments, the editing screen in the clone environment may show that pair programming is being executed and a task to be edited in pair programming is "123" and indicate the respective names of engineers performing pair programming (1414). Also, in embodiments, the client (202-1) may be configured to be unable to activate the window (1101) of the editing screen in the local environment until the window (1401) of the editing screen in the clone environment is cleared. That is, when pair programming is completed, the client (202-1) may activate the window (1101) of the editing screen in the local environment upon clearance of the window (1401) of the editing screen in the clone environment.

Figure 15:
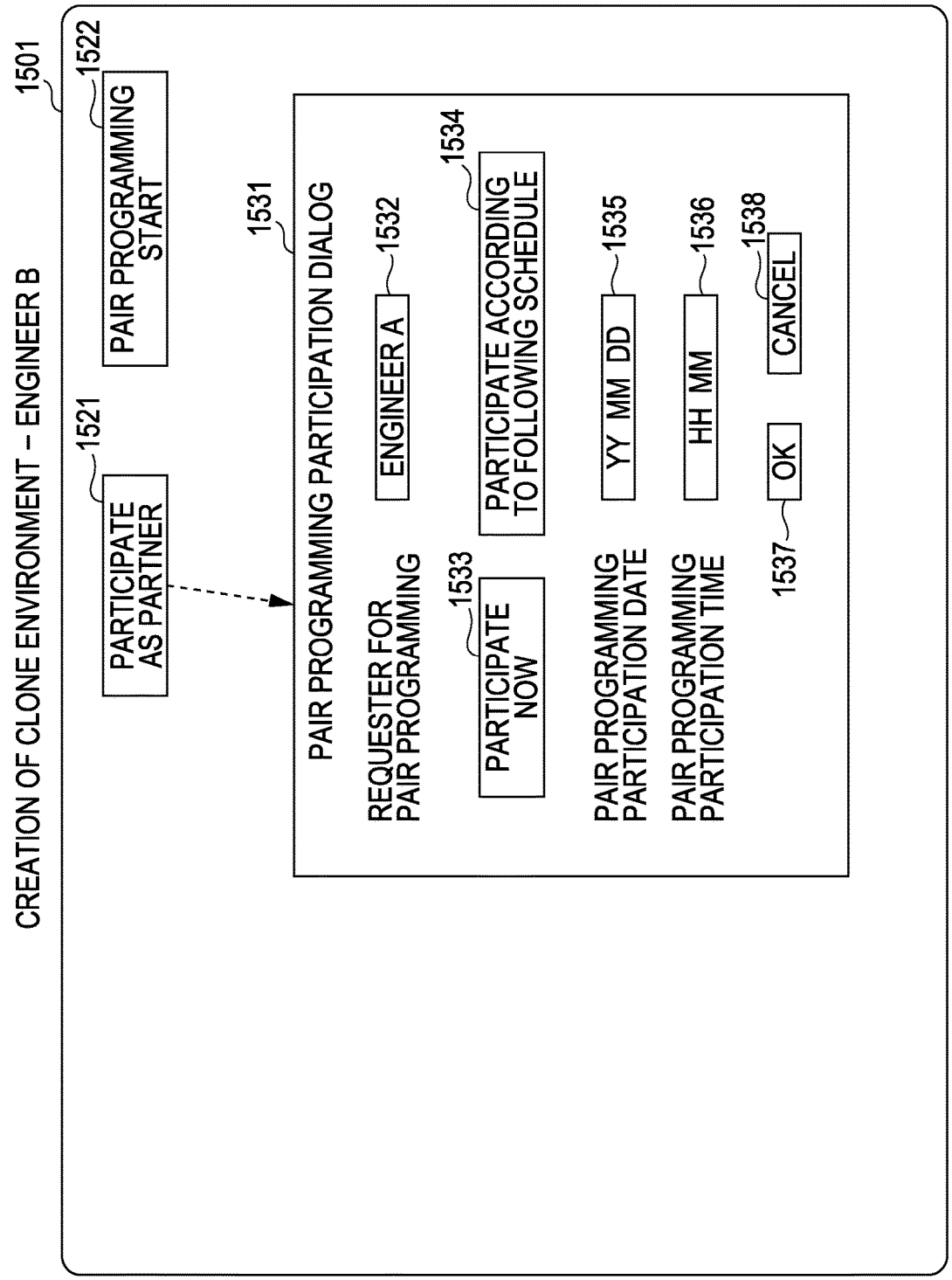
FIG. 15 illustrates an exemplary screen for sending a notice of intent to participate in a clone environment in a second client (engineer B) according to embodiments of the present invention.

FIG. 15 illustrates an exemplary screen for sending a notice of intent to participate in a clone environment in the second client (the engineer B) according to embodiments of the present invention. FIG. 15 illustrates a screen (1501) of the client (202-2) of the engineer B who performs pair programming in cooperation with the engineer A. The screen (1501) presents a pair programming participation dialog (1531) from the engineer A. A notice of recruitment inviting a participant in pair programming may be sent to the engineer B via, for example, an integrated development environment of the client (202-2) of the engineer B, a dashboard, a mail, or an instant messenger. The pair programming participation dialog (1531) includes, for example, dialog boxes (1532, 1533, and 1534) for indicating the name of a requester for pair programming and that the engineer B can "participate now" or participate later (for example, "participate according to following schedule"). The server (201) may be notified, by the engineer B selecting the "participate now" dialog box (1533) and pressing an "OK" button, that the engineer B can participate in pair programming immediately. When the engineer B does not participate in pair programming immediately and specifies scheduled date and time as necessary at which the engineer B can participate in pair programming, the server (201) can be notified of the scheduled date and time, at which the engineer B can participate in pair programming. Moreover, the pair programming participation dialog (1531) may include a check box (not shown) for selecting editing or browsing of content.

FIG. 16 illustrates an exemplary screen for editing or browsing content in a clone environment in the second client (the engineer B) according to embodiments of the present invention. FIG. 16 illustrates the screen (1501) of the client (202-2) of the engineer B. The screen (1501) includes editing or browsing screens (1611, 1612, 1613, and 1614) for an IDE application in a clone environment created on the server (201). Moreover, the screen (1501) may show that pair programming is being executed and a task to be edited in pair programming is "123" and indicate the respective names of engineers performing pair programming (1614).

FIG. 17 illustrates an exemplary screen for terminating pair programming in a clone environment in the first client (the engineer A) according to embodiments of the present invention. FIG. 17 illustrates the screen (1301) of the first client (202-1) of the engineer A. It is assumed that the engineer A needs to terminate pair programming. The engineer A clicks a "pair programming end" button (1322) on the screen (1301) with, for example, a mouse. In response to this operation, a window (1731) for a pair programming termination dialog appears on the screen (1301). The pair programming termination dialog window (1731) includes a box (1732) for indicating the number of a task that is currently edited, a box (1733) for making a comment, dialog boxes (1734, 1735, and 1736) for candidates for merge destinations into which the editing result is merged, an "OK" button (1737), and a "cancel" button (1738). The engineer A can select a merge destination from the dialog boxes (1734, 1735, and 1736). Merge destinations are, for example, the first client (202-1) (1734) and the SCM server (203) (1735). The engineer A specifies one or more merge destinations, makes a comment as necessary, and then presses the "OK" button. Upon pressing of the "OK" button, pair programming is terminated. Moreover, the editing result in pair programming can be stored in the specified merge destinations. Moreover, upon termination of pair programming, the screen (1301) of the client (202-1) of the engineer A can be switched to the screen of the local environment.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises," "comprising," "includes," "has," and other similar terms, when used in this specification, specify the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

What is claimed is:

1. A method for pair programming comprising:
    in response to a request from a user of a first client to create a clone environment of a local environment of the user of the first client, retrieving clone environment creation parameters corresponding to local information of the local environment from a registry located on a server and creating a first clone environment of the local environment of the first client on the server from the clone environment creation parameters;
    receiving a notice of intent to participate in the first clone environment from a second client, the second client different from the first client;
    receiving a notice of intent to participate in the first clone environment from a third client, the third client different from the first client and the second client;
    after receiving the notices of intent to participate in the first clone environment from the second client and the third client, enabling concurrent real-time sharing of the first clone environment by the first client, the second client, and the third client, and, enabling on the server, shared real-time pair programming of the same software code in the first clone environment, wherein the same software code is edited by the first client and the second client, and the third client at the same time;
    recording operations performed in the first cloned environment as a changeset, wherein the server registers the changeset with a software configuration management (SCM) server managing a change history of the software code and said SCM enables reproduction of versions of the software code;

receiving an instruction to terminate editing of the software code in parallel with receiving a destination to merge the changeset;

transferring the changeset to the first client;

merging the changeset into corresponding data of the local environment; and synchronizing the first clone environment on the server with the local environment after the instruction to terminate editing.

2. The method according to claim 1, wherein the step of creating the first clone environment includes the steps of:

retrieving, using information on the local environment, components of an environment for creating the clone environment on the basis of information from a repository in association with the server; and merging components of the local environment of an application held by the first client into the retrieved components.

3. The method according to claim 1, wherein the step of enabling pair programming includes the steps of:

checking, upon start of editing program code in a file on the server, whether information in association with a name of the file has been sent from the first client;

in a case where the information in association with the name of the file has not been sent from the first client, sending the name of the file to the first client;

acquiring the information in association with the sent name of the file from the first client;

retrieving parameters corresponding to the acquired information from a registry existing in the server; and if the information in association with the name of the file has been sent from the first client, retrieving the parameters corresponding to the information in association with the name of the file from the registry existing in the server; and merging parameters of the local environment of the application held by the first client into the retrieved parameters.

4. The method according to claim 1, wherein enabling pair programming of the software code in the clone environment is implemented by causing the first client to switch the local environment on a screen of the first client to the clone environment or display a window of the clone environment on the screen of the first client.

5. The method according to claim 1, further comprising the step of inquiring whether a client participates in the clone environment in response to the request to create the clone environment.

6. The method according to claim 1 further comprising:

after receipt of the notice of intent to participate from the second client, querying the first client whether the first client permits the second client or a user in association with the second client to participate in the clone environment, and wherein the step of creating the first clone environment is performed upon receipt of permission for the second client or the user in association with the second client to participate in pair programming in the clone environment from the first client.

7. The method according to claim 1, further comprising the step of:

the server, storing the changeset that is a log of operations of editing or browsing performed in the clone environment in a storage unit associated with the server.

8. The method according to claim 1, further comprising the step of:

server storing an identifier of each participant or start time and termination time of operations in the first clone environment in a storage unit associated with the server.

9. The method according to claim 2, wherein the information on the local environment is runtime information of a development environment, baseline information of a file, a document, or code to be used in the application, or private file information.

10. The method according to claim 9, wherein the runtime information of the development environment is a type of an integrated development environment, a version of a virtual machine, or a software configuration management name.

11. The method according to claim 9, wherein the baseline information is version management information of a file, a document, or code.

12. The method according to claim 10, wherein the private file information is source or a library in association with content to be edited.

13. The method according to claim 2, wherein the step of creating the first clone environment further includes the step of receiving the information on the local environment and the components of the local environment from the first client.

14. The method according to claim 1, wherein the local environment of the application is an integrated development environment, an office application environment, or an educational support environment.

15. The method according to claim 1, wherein the pair programming comprises development of computer source code.

16. A method for operating a server comprising:

in response to a request from a user of a first client to create a clone environment, creating a shareable clone environment on a server using information of the local environment held by the first client;

receiving a notice of intent to participate in the shareable clone environment from at least a second client and a third client;

after receiving the notice of intent to participate in the shareable clone environment, the server querying the first client whether the first client permits the second client or a user in association with the second client to participate in the shareable clone environment;

after receiving the notice of intent to participate in the clone environment, the server querying the first client whether the first client permits the third client or a user in association with the third client to participate in the shareable clone environment;

after receiving the notices of intent to participate in the shareable clone environment, enabling real-time shared concurrent pair programming of computer source code in the shareable clone environment on the server, wherein the computer source code is edited by the first client, and the second client, and the third client at the same time recording operations performed in the first cloned environment as a changeset, wherein the server registers the changeset with a software configuration management (SCM) server managing a change history of the computer source code and said SCM enables reproduction of versions of the computer source code;

receiving an instruction to terminate editing of the computer source code in parallel with receiving a destination to merge the changeset;

merging the changeset into corresponding data of the local environment of the first client; and synchronizing the first clone environment on the server with the local environment after the instruction to terminate editing.

17. The method according to claim 16 wherein the step of enabling editing or browsing is performed after receipt of permission for the second client having sent the notice of intent to participate or the user in association with the second client to participate in the shared clone environment from the first client.

18. A computer system comprising:
a first computer component configured for receiving, in response to a request to create a shareable clone environment of the local environment of a user of a first client, a notice of intent to participate in the shareable clone environment from a second client, the second client different from the first client;

a microprocessor configured for creating the shareable clone environment of the local environment of the user of the first client, on a computer using information on the local environment held by the first client;

the microprocessor configured for enabling on the computer concurrent shared real-time pair programming of computer software code in the shareable clone environment, wherein the computer software code is edited by both the first client and the second client at the same time;

recording operations performed in the sharable clone environment as a changeset;

registering the changeset with a software configuration management (SCM) server managing a change history of the computer software code edited by the first client and second client;

receiving an instruction to terminate editing of the computer software code in parallel with receiving a destination to merge the changeset;

merging the changeset into corresponding data of the local environment; and synchronizing the sharable clone environment with the local environment after the instruction to terminate editing of the computer software code.

19. A device comprising:
a first computer component configured for creating, in response to a request to create a shareable clone environment of a local environment of a user of a first client, the shareable clone environment on a computer using information on the local environment held by the first client;

a second computer component configured for receiving a notice of intent to participate in the clone environment from a second client, the second client different from the first client; and a third computer component configured for enabling on the computer real-time pair programming the same computer software code in the shareable clone environment, wherein the same computer software code is editable by both the first client and the second client, and a third client at the same time;

recording operations performed in the sharable clone environment as a changeset;

registering the changeset with a software configuration management (SCM) server managing a change history of the same computer software code editable by both the first client and the second client;

receiving an instruction to terminate editing of the same computer software code in parallel with receiving a destination to merge the changeset;

merging the changeset into corresponding data of the local environment; and synchronizing the sharable clone environment with the local environment after the instruction to terminate editing of the same computer software code.

20. A nontransient computer program product storing instructions thereon, the instructions, when executed by a computer, cause the computer to:

after receiving a request to create a clone environment of a local environment of a user of a first client, create the shareable clone environment of the first client on the computer using information about the local environment held by the first client;

receive a notice of intent to participate in the shareable clone environment from a second client, the second client different from the first client; and after receiving the notice of intent to participate in the shareable clone environment from the second client, enable on the computer real-time participation in the shareable clone environment, wherein software code in the shareable clone environment is editable by the first client and the second client, and a third client, at the same time, the third client having previously sent a notice of intent to participate in the shareable clone environment;

recording operations performed in the sharable clone environment as a changeset;

registering the changeset with a software configuration management (SCM) server managing a change history of the software code and said SCM enables reproduction of versions of the software code;

receiving an instruction to terminate editing of the software code in parallel with receiving a destination to merge the changeset;

merging the changeset into corresponding data of the local environment;

synchronizing the sharable clone environment with the local environment after the instruction to terminate editing of the software code.

* * * * *